June 30, 1970     P. POMELLA ET AL     3,518,513
POSITION CONTROL DEVICE COMPRISING AN INTERPOLATING UNIT
Filed Aug. 29, 1966     18 Sheets-Sheet 1

INVENTORS
PIERO POMELLA
LUCIANO LAURO
BY Shoemaker and Mattare
ATTYS.

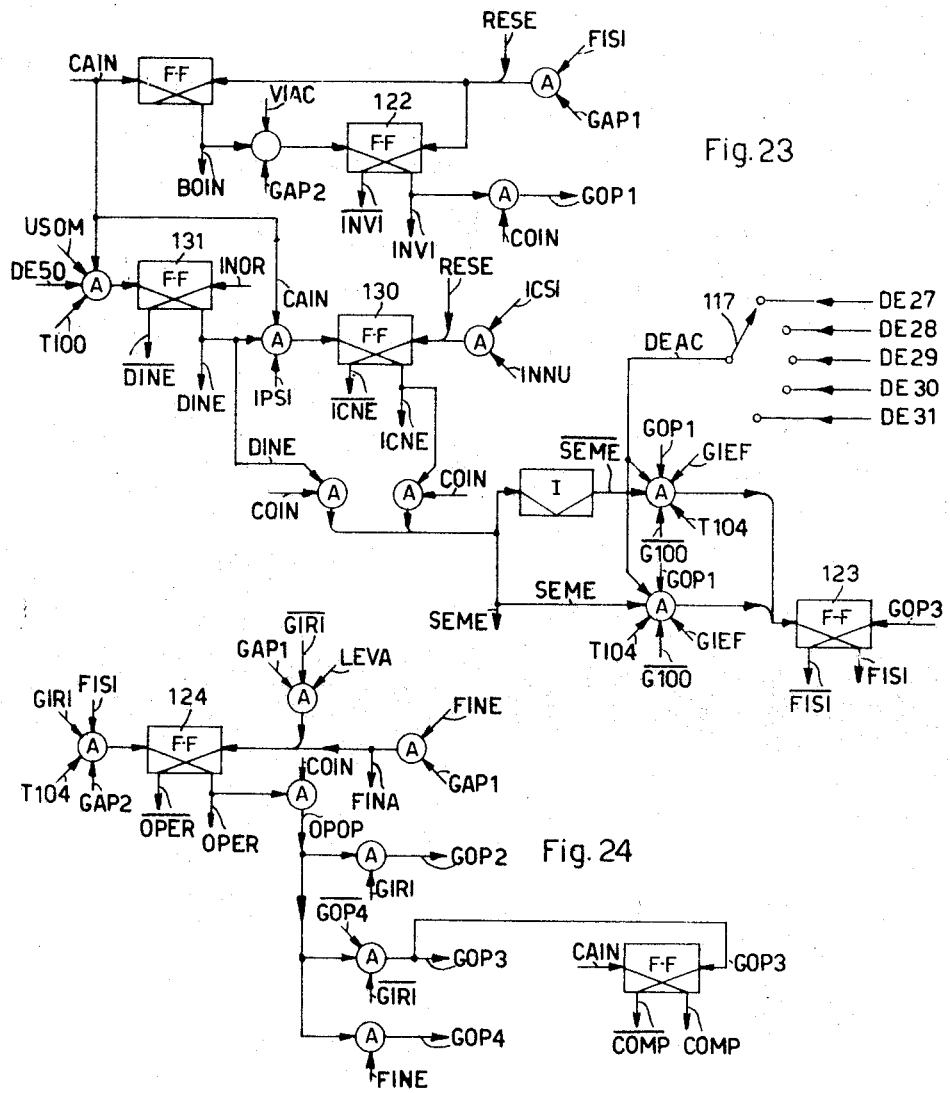
Fig. 23
Fig. 24
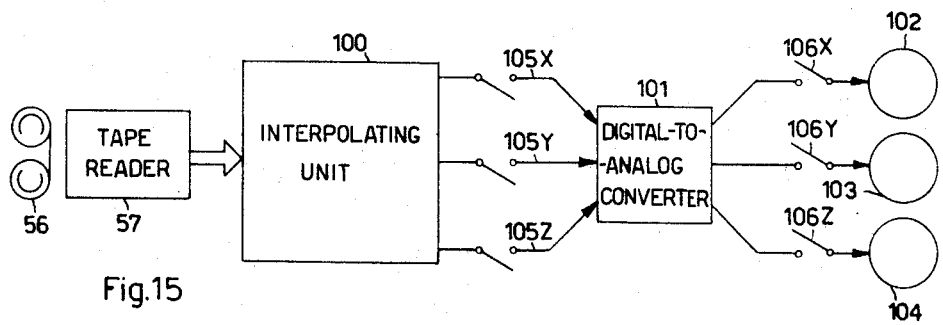
Fig. 15

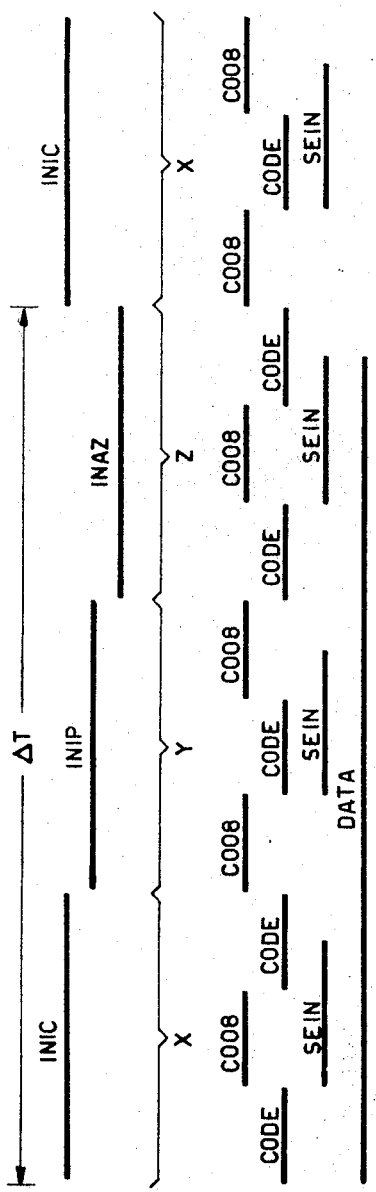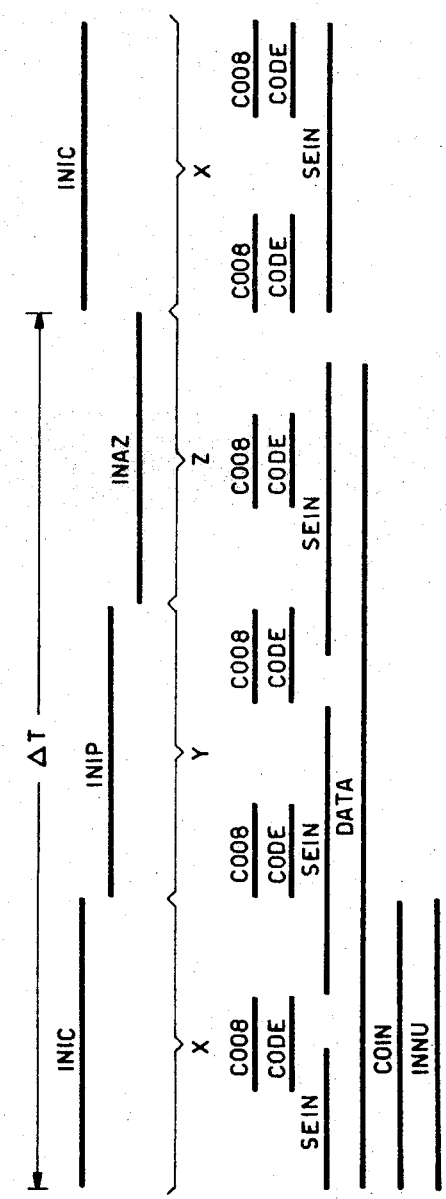

United States Patent Office 3,518,513
Patented June 30, 1970

3,518,513
POSITION CONTROL DEVICE COMPRISING AN INTERPOLATING UNIT
Piero Pomella and Luciano Lauro, Ivrea, Torino, Italy, assignors to Ing. C. Olivetti & C., S.p.A., Ivrea, Italy
Filed Aug. 29, 1966, Ser. No. 575,802
Claims priority, application Italy, Sept. 3, 1965, 20,440/65
Int. Cl. G05b 19/24
U.S. Cl. 318—571   12 Claims

ABSTRACT OF THE DISCLOSURE

A programmable control system is disclosed suitable to control the feed of a movable machine part along one or more controlled coordinate axes, wherein when the part reaches a previously specified coordinate point, a new coordinate point is specified which is remote from the previous point. The system then cyclically computes and accumulates in registers multiple interpolation increments of motion along the axes proportioned in ratios representing the relative rates of progression along these axes required to arrive at the newly specified coordinate point. These increments are accumulated in separate digital registers, one for each axis, and these registers are coupled to converters which convert the accumulated data into suitable form to drive servo-system means operative to move the machine part along the axes. The system is preset to provide suitable limits for rate of motion, acceleration and other parameters appropriate for the machine operation being controlled. Acceleration and deceleration are performed by further computations made during the systems interpolating cycles involving adding or subtracting differential increments again and again to progressively build up or reduce the size of each subsequent motion increment. In one mode of operation this acceleration continues until one of said preset limits is reached, and the distance to this point is remembered. The system then continues without acceleration until it approaches this distance from the specified arrival point, at which time it decelerates through similar differential increments. As the final arrival point is approached, the system then sets the specified coordinates thereof into the registers.

---

The present invention relates to a position control device, comprising an interpolating unit.

The known position control devices pertain to two different types of control: the point-to-point position control and the continuous position control.

The first type of control allows the displacement of the movable part of a machine from a point to another subsequent point, along a plurality of axes contemporaneously, without any possibility of controlling the travelled path, the working operations being controlled only after the coming and the stopping of the movable part on each of the programmed points.

The information necessary and sufficient to program a point-to-point positioning consists only of the coordinates of each successive arrival point, which are recorded in a program unit (generally constituted by a perforated tape) directly by an operator which carries onto the recording support the coordinates read on a drawing or on predisposed schedules, through a perforating machine translating said coordinates to coded characters.

The continuous position control allows any type of working contemporaneously to the displacement of the movable part of the machine. To obtain a position control along a continuous path, so as to allow the performance also of complex works, the necessary information is constituted by the coordinates of points sufficiently approached and in case by the travel speed. In the best known continuous position control systems, said information is recorded on a support allowing a high density of recorded data (generating a magnetic tape). To prepare the recorded program it is necessary to make a series of operations, which can be briefly described as follows: supposing that the operations of a machine-tool are to be controlled, on the basis of the read drawing of the workpiece, the programmer prepares a schedule containing geometrical data (principal points of the path to be travelled and characteristics of the lines joining pairs of successive principal points) and technological data (feeding speed, admissible acceleration, etc.); these data are then transferred in binary code to perforated cards or to perforated tape, which go to feed an electronic computer; the latter, according to the entered data, computes data relating to all the successive points of the requested program and records them.

The use of said known system for a continuous position control involves an arduous and expensive programming because it is necessary to use external electronic computers. Especially in the case of small workshops, which are equipped with one or few machines provided with a continuous position control device, the programming cost weighs heavily on the working cost.

In order to obviate these disadvantages it has been proposed to equip the continuous position control device with a special internal computer which, fed by a program comprising a sufficient number of geometrical and technological data recorded e.g. on a paper perforated tape, continuously computes the intermediate point pertaining to the trajectory which joins the discrete points of the program. Said special computer operates as an interpolating unit.

The known embodiments of this type require very complicated and expensive apparatus. Moreover the programming is not sufficiently simple for programmers generally available in small workshops.

Accordingly it is an object of the invention to provide a control device for positioning a movable part of a machine-tool along one or more axes, which is able to interpolate, through a rectilinear segment, the trajectory between two successive position points furnished by a program, so that in a position control system fed by intermittently furnished data said device allows continuously controlled positioning.

A further object of the invention is to provide a control device which utilizes the information relating to starting and arrival points in a system apt to control the positioning of the movable part of a machine along two or more axes in order to derive signals modifying the speed of said movable part along each axis in such a way that it follows a rectilinear path between two successive points, i.e. a starting point and an arrival point, so that it correctly reaches the arrival point.

A further object of the invention is to provide a control device operating as a computer for continuously calculating the points of a trajectory approximated by a broken line consisting of any number of rectilinear segments.

A further object of the invention is to provide a control device for continuously positioning the movable part of a machine along two or more axes, so that positioning drift errors along said broken line one eliminated by means of control executed in each of the successive positioning points furnished by the program.

A further object of the invention is to control the speed and the deceleration of said movable part near to each arrival point, so that the approaching and the stopping in said arrival point occur without uncertainties and oscillations of the movable member.

The above-mentioned disadvantages are obviated and the above-mentioned objects are reached by means of the device according to the invention. More particularly, according to the invention, a control device for positioning a movable part of a machine-tool or of a similar equipment along one or more axes, fed by a program unit which is apt to furnish discontinuous positioned orders, and comprising an interpolating unit which operates by accumulating position increments during successive interpolating cycles, said unit feeding for each of said axes a different servo-system able to execute said positioning, is characterized in that the amount of the increment accumulated during each interpolating cycle is variable in order to control the speed and the acceleration of said movable part along its path.

The device, according to the invention, is able to control very complex operations requiring simultaneous and coordinated movement of the movable part of the machine along several axes. Moreover the programming maintains the simplicity and the immediacy of the point-to-point control programming, as it is necessary to program only the coordinates of successive discrete points along the trajectory and the maximum speed admissible along the segments of lines joining pairs of successive discrete points. Moreover the structure of the interpolating unit according to the invention is of the utmost simplicity, so that the total cost of the device is very low.

This and other features of the invention will clearly appear from the following description of a preferred embodiment thereof, made by way of example and not in limiting sense, with reference to the annexed drawings, in which:

FIG. 15 shows a general block diagram of a preferred embodiment of the device according to the invention;

FIGS. 20 and 21 show time diagrams of the principal signals present during the entering of speed digits respectively of coordinate digits into the interpolating unit of the device according to the invention;

FIGS. 23 and 24 show logical networks conditioning the computation of the speed increment in the interpolating unit of the device according to the invention;

GENERAL DESCRIPTION

The device according to the invention allows continuously controlled positioning of the movable part of a machine-tool, or of a similar equipment, through a distinct servo-system for each axis capable of positioning said movable part under the control of position orders recorded in a program unit and continuously furnished to said device.

In the following description reference will be made to a machine-tool, wherein said movable part is displaceable along two or more axes. For example, it will be supposed that displacement of said movable part along two axes (X, Y, or X, Z, or Y, Z) is allowed. Said movable part may be constituted by the tool of the machine displaceable relative to fixed workpiece or it may be constituted by the workpiece displacement relative to the fixed tool.

Figure 1:
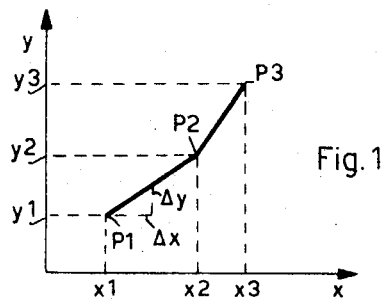
FIG. 1 shows an example of trajectory controlled by the device according to the invention.

We suppose that said movable part execute displacements along a continuous trajectory (situated on the plane of the axes X and Y) which is approximated by a broken line, whose vertices stand on the ideal continuous line and are represented by points defined by a recorded program. Therefore, the movable part of the machine moves with a rectilinear motion between each pair of successive points of the program on the plane identified by the coordinates $x, y$ of said points (FIG. 1).

The preparation of the program is executed in a way analogous to the one adopted for a point-to-point position control device. For each rectilinear segment P1–P2, P2–P3 . . . of the trajectory it is sufficient to specify the coordinates of the end points and the feeding speed. Generally said coordinates and feeding speed can be specified at the beginning of the program and whenever their value is modified, because it is sufficient to provide the interpolating unit comprised in the device according to the invention with a memory keeping track of said coordinates and said speed for all the segments of the trajectory for which they are valid. Therefore the program is constituted by a series of program blocks, each one comprising a sequence of data characters of the following type: IX – IV – K1V – K2V – K3V – K4V– K5V – IX – SX – K1X – K2X – K3X – K4X – K5X– K6X – K7X – IY – IV – K1V – K2V – K3V – K4V– K5V – IY – SY – K1Y – K2Y – K3Y – K4Y – K5Y– K6Y – K7Y – CR, wherein IV, IX, IY are address characters indicating that the next following information refers respectively to the speed V, the axis X and the axis Y; the characters SX and SY indicate the algebraic sign of the coordinates relating respectively to axis X and axis Y of the arrival point of the rectilinear trajectory segment which must be travelled by the movable part; the characters K1V to K5V represent the five decimal digits of a number defining the value of the speed V; the characters K1X to K7X and K1Y to K7Y represent seven decimal digits of a number defining the value of the coordinate relating respectively to axis X and axis Y of said arrival point; CR is a block end character determining the start of the interpolating device in order to execute the position order contained in the sequence of data of the same block.

Before the series of characters relating to a displacement axis or before the character CR it is possible to insert special characters $AU1 \div AUN$ to control the auxiliary functions of the machine-tool (speed and rotation sense of the chuck, lubrication, automatic tool change, etc.).

We will note that the seven characters K1X to K7X and K1Y to K7Y represent decimal values of the coordinates relating respectively to axis X and Y and comprised between 1 μm. and 10 m., these values being sufficient to comply with the approximation requested for said coordinates and to represent the coordinates of the maximum stroke. The characters K1V to K5V in their turn are also largely sufficient to represent the speed values normally used in the machine-tools, as it will be more clearly specified in the following description.

Therefore, the position data entered in the interpolating unit as a program block are only the feeding speed and the coordinates of the arrival point. The further information necessary for linearly interpolating the path of the movable part between the starting point and the arrival point is calculated by the interpolating unit according to the invention in the way we will now describe.

Figure 2:
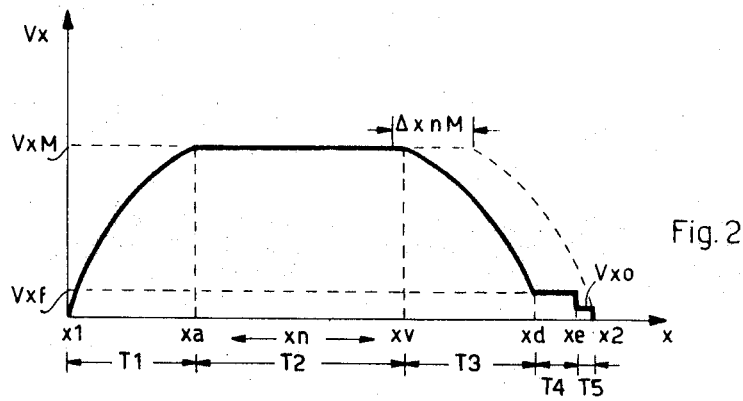

The type of motion to be performed according to the invention by the movable part of the machine between a starting point and an arrival point is generally as follows: from the starting point, e.g. P1 ($x1$, $y1$), the movable part must accelerate along the rectilinear trajectory segment till reaching the maximum admitted feeding speed; successively it must go at constant speed along said rectilinear segment and finally, at a certain distance from the arrival point, it must decelerate to reach the arrival point P2 ($x2$, $y2$) at zero velocity. This type of motion is represented in FIG. 2, wherein reference is made only to the displacements along axis X, which are indicated on abscissa, while the values of the speed VX along said axis in the segment identified by the coordinates $x1$ and $x2$ are represented on ordinate. An analogous diagram is valid for the displacement along axis Y. According to a preferred embodiment of the invention, the segments between the coordinates $x1$ and $xa$ and between the coordinates $xv$ and $xd$ are travelled at constant acceleration and constant deceleration respectively. In order to make really rectilinear the path travelled between two points P1 and P2, which are the ends of a segment programmed as rectilinear, it is necessary for the ratio between the increments $dx$, $dy$ of the two coordinates $x$ and $y$, produced in the same time interval, to be always equal to the ratio of the distance ($x2-x1$) and ($y2-y1$) comprised between said two end points and measured along said axes X, Y (FIG. 1), i.e.

$$\frac{dx}{dy}=\frac{x2-x1}{y2-y1}$$

wherein $dx$ and $dy$ indicate the increments of the coordinates $x$, $y$ (position increments) produced during said time interval. Therefore also the instantaneous velocities along said two axes, as well as the instantaneous accelerations along said two axes, will be between them in the same ratio.

In order to travel the rectilinear path between P1 and P2 at a feeding speed following the diagram of FIG. 2, it is necessary to perform a sequence of calculations, which are executed by the interpolating unit according to the criteria which will now be specified.

The interpolating unit operates cyclically, DT being the constant period of an interpolating cycle.

First we will consider the motion component along axis X. We suppose also that $x1$ is the coordinate of the starting point P1 of the rectilinear path travelled by the movable part; $x2$ is the coordinate of the arrival end point P2; $xn$ is the coordinate of the point, on the trajectory between P1 and P2, wherein the movable member is at the instant $Tn$ at which the $n$th interpolating cycle begins; $Dxn$ is the increment given to $xn$ during the ($n-1$th) interpolating cycle (this increment, which later will be designed as position increment, is approximately proportional to the instantaneous speed $Vx$ along axis X, as DT is constant); $hx$ is the increment given to $Dxn$ during an interpolating cycle in the acceleration phase T1 and in the deceleration phase T3 (this increment is approximately proportional to the instantaneous acceleration along axis X, as DT is constant); $DxM$ is a constant, pre-established before starting the interpolation and indicating the maximum increment admissible for the coordinate $xn$, i.e. as a consequence of what already said, the maximum admissable speed along axis X, $VxM$. Generally, during the whole trajectory interpolation between $x1$ and $x2$, the interpolating unit must satisfy the condition:

$$\frac{Dxn}{Dyn}=\frac{x2-x1}{y2-y1} \qquad (1)$$

to make rectilinear the trajectory.

Moreover, during the initial phase T1 (FIG. 2) at constant acceleration, the interpolating unit operates according to the following formulae:

$$Dx(n+1)=Dxn+hx \qquad (2)$$

$$x(n+1)=xn+Dx(n+1) \qquad (3)$$

Formula 3 establishes which position $x(n+1)$ the movable part must occupy at the end of the $n$th interpolating cycle, on the basis of the position $xn$ occupied at the beginning of said cycle.

Formula 2 establishes, on the basis of the position increment $Dxn$ used during the preceding interpolating cycle, the value of the position increment (i.e. speed) $Dx(n+1)$ to be used during the present $n$th interpolating cycle.

As $hx$ is constant, it is clear that Formula 2 insures the stroke ($xa-x1$) of the trajectory to be travelled is at a constant acceleration proportional to $hx$.

During this initial phase T1, besides the proper interpolating operations indicated by the Formulae 1, 2 and 3, other operations are executed in order to calculate some data necessary to define the instants wherein acceleration changes occur on the diagram of FIG. 2:

$$\sum_{1}^{n} Dxn = \sum_{1}^{n-1} Dxn + Dxn \qquad (4)$$

$$\sum_{1}^{n} Dxn + Dxn = Pxn \qquad (5)$$

$$x2-xn=Rxn \qquad (6)$$

$$Dxn > DxM \qquad (7)$$

Operation 4 defines the value of the progressive distance $$xn-x1=\sum_{1}^{n} Dxn$$

travelled by the movable part from the starting point $x1$ of the present rectilinear segment of the trajectory to the end of the ($n-1$th) interpolating cycle, said progressive distance being derived from the progressive distance $$\sum_{1}^{n-1} Dxn$$

travelled at the end of the ($n-2$th) interpolating cycle and from the position increment $Dxn$ occurred in said ($n-1$th) interpolating cycle.

Operation (5) defines the value of a fictitious distance $Pn$ equal to said progressive distance $$\sum_{1}^{n} Dxn = xn-x1$$

increased by the last increment $Dxn$ to the coordinate $x$

Operation (6) defines the value $Rxn$ of the remaining distance which is still to be travelled by the movable part at the end of said ($n-1$th) interpolating cycle in order to reach the end point $x2$.

Moreover, during the entire phase T1 performed at constant acceleration, the comparison operation (7) is executed for each interpolating cycle, i.e. a control is made to check whether the instantaneous speed (position increment) $Dxn$ has exceeded or not the maximum admissible speed $DxM$, i.e. $VxM$.

Simultaneouly, during this phase T1, operations analogous to (4), (5), (6) and (7) are performed for axis Y by the interpolating unit, said operations being obtainable from (4), (5), (6) and (7) simply by substituting letter $y$ to letter $x$.

The initial phase T1 at constant acceleration ends at the end of that interpolating cycle wherein the inequality (7) occurs either for axis X or for axis Y. More precisely, the phase T1 ends at the end of that interpolating cycle wherein on the basis of Formula 2, either for axis X or Y an increment $Dxn$ respectively $Dyn$, greater than the maximum admissible increment $DxM$ respectively $DyM$, has been calculated. In the continuation of this description we will indicate said last increments calculated at the end of the phase T1 by means of $DxnM$ respectively $DynM$ (i.e. the reached velocities). It is to be noted that said final increments $DxnM$ and $DynM$ can exceed the maximum increments $DxM$ respectively $DyM$ by an amount no greater than the maximum increment $hx$ respectively $hy$. In other words said phase T1 ends when along either axis X or Y the maximum admissible speed $VxM$, respectively $VyM$, has been reached.

It is also to be noted that, in dependance on the trajectory slope with respect to the axes and on the possible diversity of the maximum admitted velocities for the two axes, it may happen that the inequality (7) occurs first for axis X or for axis Y.

At the end of phase $T_1$ the summation $$\sum_1^n Dxn$$

obtained on the basis of the Formula 4 represents the total distance $(xa-x1)$ travelled along axis X at the end of the interpolating cycle, wherein the maximum admitted speed has been reached or exceeded along either axis X or axis Y.

Therefore this distance $(xa-x1)$ represents the distance which has been travelled in order to reach said maximum speed at constant acceleration.

The value $PnM$ of the fictitious distance $Pn$ corresponding to said distance $(xa-x1)$ increased according to Formula 5 is stored in a proper register at the end of the phase T1.

The initial phase T1 at constant acceleration is followed (see FIG. 2) by the phase T2 at constant speed, wherein the movable part pursuses its motion at a speed equal to $DxnM$ for axis X, respectively $DynM$ for axis Y, reached at the end of the phase T1.

During this phase T2 the interpolating unit executes the following operations:

$$x(n+1)=xn+DxnM \qquad (3')$$

$$x2-xn=Rxn \qquad (6)$$

$$Rxn<PxnM \qquad (8)$$

Formula 3' is analogous to 3, with the only difference that the position increment during the successive interpolating cycles is constant and equal to $DxnM$, so that the speed remains constant.

Formula 6 has already been explained.

Inequality (8) is verified by comparing, for each interpolating cycle, the remaining distance $Rxn$, still to be travelled for reaching the end point $x2$, with the fictitious distance $PxnM$ stored in the register.

The phase T2 at constant speed ends at the end of the interpolating cycle wherein the inequality (8) occurred for the first time.

The phase T2 at constant speed is followed (FIG. 2) by the phase T3 at constant deceleration, during which the movable part decelerates with the same absolute acceleration value (proportional resspectively to $hx$ and $hy$ for the two axes) already used during the acceleration phase T1.

During this phase T3 the interpolating unit executes the following operations:

$$Dx(n+1)=Dxn-hy \qquad (2')$$

$$x(n+1)=xn+Dx(n+1) \qquad (3)$$

$$Dxn<1 \ \mu m. \qquad (9)$$

Operation (2') is analogous to operation (2), apart from the sign of the speed increment $hx$.

The comparison operation (9) is used to establish, in a way explained later on, the end of the phase at constant deceleration.

Comparison (8) for establishing the deceleration start is made by considering the fictitious distance $PxnM$, suitably increased in the way already explained with respect to the distance travelled during the acceleration, instead of considering the last named distance, just because it is an object of the invention to secure the movable part against the possibility of reaching end position $(x2, y2)$ with a speed different from zero and therefore to go unduly over the arrival point P2. This occurrence, which would have no consequence in a point-to-point position control device, in the present case should be avoided, because the entire trajectory should be controlled, e.g. because it is travelled in order to cut out a profile. We note that for avoidnig this occurrence it would not be sufficient to break off the interpolation and to send a stop order to the movable part as soon as the distance $(x2-xn)$ becomes lower than the desired approximation. In fact, the seed reached at that instant during the deceleration phase might be still excessive in order that the remaining space is sufficient for stopping. Thus, for avoiding that occurrence it is necessary, as already stated, to provide for the deceleration phase a distance equal to the one travelled during the acceleration phase plus an additional security space, sufficient for stopping. As coordinate $xn$ increased by increments $DxnM$ during phase T2 at constant speed, said additional space can not be shorter than $DxnM$.

Therefore, as the beginning of phase T3 is produced by applying the comparison indicated by (8) (i.e. the deceleration starts as soon as the distance from the arrival point P2 results shorter than the distance travelled during the acceleration phase plus $DxnM$), the movable part of the machine will have time to complete its deceleration before passing the end point P2.

Accordingly, the phase at constant deceleration is broken before the stop and substituted with a low speed movement approaching the end point P2.

It would be possible to perform said low speed approaching movement till the remaining distance $x2-xn$ (or respectively $y2-yn$) reaches a limit value sufficiently low to assume the requested position accuracy and at this instant to break off the interpolating operation.

However, if the speed of said approaching movement has been selected too low, too much time is lost. If, on the contrary, said speed is chosen too high, the end point can be passed during said approaching movement. This disadvantage can occur both because the inertia of the movable part does not allow a timely stopping, and because the position increment $Dxn$ executed during an interpolating cycle is greater than the requested position accuracy. Thus it can occur that, during a single interpolating cycle at the start of which the movable part has not yet reached the end point with the requested approximation, said movable part passes the end point without any possibility of perceiving this.

A better solution is illustrated on FIG. 2, wherein said approaching movement is broken in two phases T4 and T5.

The phase T4 starts when the inequality (9) occurs. During this phase T4 the interpolating unit executes the following operations:

$$x(n+1) = xn + Dxnf \qquad (3'')$$

$$x2 - xn < 16 \ \mu m. \qquad (10)$$

Operation (3'') produces the movement at constant speed Vxf, i.e., at constant postion increments equal to increment Dxnf reached at the end of the deceleration phase, i.e. reached when inequality (9) occurs the first time.

Comparison operation (10) produces the end of the phase T4.

During the phase T5 the interpolating unit makes the following operations:

$$x(n+1) = xn + hx \qquad (3''')$$

$$x2 - xn < 1 \mu m. \qquad (10')$$

Operation (3''') produces the movement at constant speed equal to $Vro = hx/DT$. The choice of this speed value, even if not necessary is convenient.

Comparison operation (10') produces the end of the phase T5, and therefore also the end of the entire interpolation.

Therefore it is clear that the phase T3 ends when during the deceleration phase a sufficiently low speed is reached, e.g. a speed corresponding, according to (9), to a position increment having the value 1 μm. and executed during an interpolating cycle. It is also clear that the phase T4 ends when the movable part has reached a prefixed distance from the end point P2, said distance having e.g. the value 16 μm. according to Formula 10, and that the final phase T5 ends when the movable part comes, according to (10'), on a distance from the end point lower than the desired accuracy (supposed equal to 1 μm).

After the movable part has reached a position distant less than 1 μm. (requested accuracy) from the end point, the interpolation is interrupted, as already explained, and the movable part can be stopped and clamped in its position by known means, e.g. by a braking device or a mechanical clamp. But said movable part is preferably retained in its position by the same position servo-system fed by constant position order. To this purpose the position can be constituted both by the last coordinates calculated during the interpolation, and, preferably, by the coordinates of the end point P2 furnished by the program unit.

Figure 3:
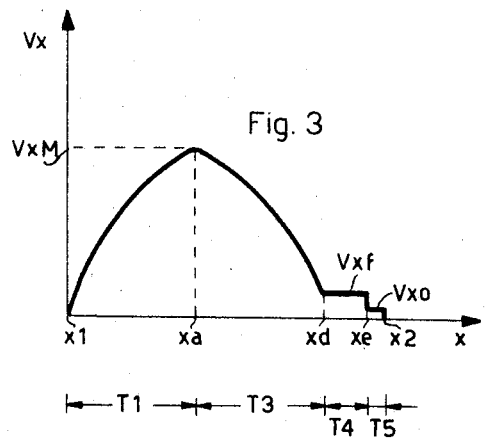

Besides the case illustrated in FIG. 2, other cases can occur according to the distance to be travelled between the points P1 and P2. FIG. 3 shows the case wherein in the speed diagram the stroke at constant speed VxM fails, since the conditions starting the deceleration phase occur before the end of the acceleration phase. Therefore the displacement of the movable part of the machine between the positions x1 and x2 comprises a first acceleration phase, having a period T1, comprised between the positions x1 and xa, at the end of which the reached speed is lower or equal to the maximum admissible, and a second next following deceleration phase, having a period T3, comprised between the positions xa and xd; said phases are followed by the phases T4 and T5, whose speed is constant and reduced from one phase to another, analogously to the case illustrated in FIG. 2. The position xa is determined by the occurrence of the starting instant of the deceleration condition (8), i.e.

$$x2 - xn < \left( \sum_{1}^{n} Dxn \right) + Dxn$$

or by the occurrence of the corresponding condition for axis Y.

Figure 4:
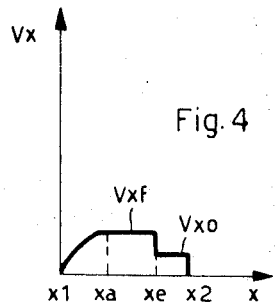
FIGS. 2, 3, 4 and 5 show possible speed diagrams along a displacement axis of the device according to the invention.

FIG. 4 shows the case wherein the distance $(x2-x1)$ is greater than 16 μm. and such as to occur while also inequality (9) is contemporarily valid: in this condition an accelerationp hase from x1 to xa is performed, followed by a phase at constant speed Vxf having a position increment DxnF constant and equal to the last increment Dxn of the acceleration phase. Successively, when the condition (10) is realized by the presence of the movable part on positive xe, a phase at constant speed Vxo takes place from xe to x2, wherein $Dxn = hx$.

Figure 5:
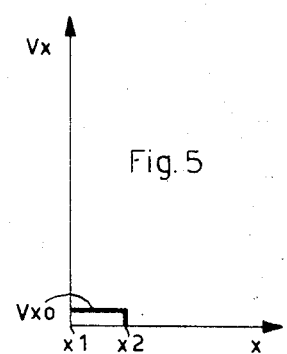

FIG. 5 shows the case wherein the difference $(x2-x1)$ is lower than 16 μm. In this condition the inequality (10) is immediately realized and therefore the movement between x1 and x2 occurs at constant speed Vxo, being $Dxn = hx$.

Therefore, the criteria governing the interpolating operation has been shown.

The values DxM and DyM, proportional to the maximum speeds admissible for the movable part along axis X and respectively Y, are furnished as data by the program unit, as already explained. The values hx and hy, proportional to the acceleration along axis X and respectively Y during the phases at constant acceleration and constant deceleration, are calculated from the program data, more particularly from the coordinates of the end points of each rectilinear segment of the trajectory, keeping in mind also that said values should always be lower than the value corresponding to the maximum admissible acceleration along each axis. This maximum acceleration, according to a preferred embodiment of the invention, can be chosen among more values, on the basis of the type of machine employed and of the type of work performed, as will be shown.

During the calculation of the aforesaid values hx and hy, which in the embodiment now described corresponds also to the value of the maximum increment conferrable to the coordinates xn and respectively yn during an interpolating cycle, the angular accuracy desired for the rectilinear trajectory travelled by the movable part is also taken in account.

If it is imposed that the maximum inaccuracy equal to 1 μm., as previously stated, is also respected at the end of a displacement P2–P1 equal to the maximum possible displacement, which is of the order of 10 m., i.e. $10^7$ μm., it will be necessary that the increments hx and hy of the coordinates xn and yn respectively are determined with an approximation equal to $10^{-7}$ μm. (i.e., in binary form, with an approximation equal to $2^{-24}$ μm.).

In order to calculate the values hx and hy in such a way as (a) Their ratio is equal to $$\frac{x2 - x1}{y2 - y2}$$

i.e. Formula 1 is satisfied;

(b) Said values are determined with ana ccuracy sufficient to assure the wanted angular accuracy for the trajectory;

(c) Said values are lower than the value corresponding to the maximum admissible acceleration;

the following operations are performed.

First, the quantities $(x2-x1)H$ and $(y2-y1)H$ are calculated, wherein $(x2-x1)$ and $(y2-y1)$ are represented by pure binary digits, each one constituted by 24 bits, so that their value is defined with an accuracy equal to $2^{-24}$, to satisfy the condition (b) and H is a nondimensional constant equal to a power of 2, such that $(x2-x1)H$ and $(y2-y1)H$ are surely lower than the maximum speed increment (acceleration) admissible for the machine, the last named increment being, as already described, a constant settable on a commutator of the machine.

Successively the two quantities $(x2-x1)H$ and $(y2-y1)H$ are simultaneously and repeatedly multiplied by 2, until one of the two quantities reaches the value corresponding to said maximum acceleration.

It is clear that in said successive multiplications by 2, said quantities continue to satisfy the condition (a). However said quantities continue also to satisfy the condition (b), provided that no binary digit is rejected during the execution of the successive multiplications.

It is also clear that, if the successive multiplications are stopped at said maximum acceleration, the condition (C) is satisfied.

In a preferred embodiment the device according to the invention comprises (FIG. 15) a program unit, e.g. a tape reader 57, connected to feed an interpolating unit 100 which essentially is a digital computer. The interpolating unit 100 feeds a digital-to-analog converter 101, which in turn feeds the servosystems 102, 103 and 104 adapted to position the movable part along the axes X, Y and respectively Z, supposing that the machine-tool is furnished with three axes to be controlled.

In the preferred embodiment, the functioning of the device according to the invention comprises a first period wherein the program unit 57 feeds the previously described data to the interpolating unit 100, i.e. the coordinates $x_2$ and $y_2$ of the end point P2 of the trajectory and the maximum speed $D_xM$ and $D_yM$ at which said trajectory must be travelled. During this period the movable part is still on the starting point P1. This period is followed by a second period, wherein the movable part still resting and the program unit 57 being inactive, the interpolating unit 100 provides for the calculation of the values $hx$ and $hy$ (speed increments) on the basis of the aforementioned criteria. A third period follows, wherein, the program unit 57 being inactive, the proper interpolation is performed. During this third period the interpolating unit 100 is active to control the positioning of the movable part in real time.

More particularly, the servo-system 102, 103 and 104 are positioning servo-systems, i.e., after reception of a position order, they are operable to carry the movable part to the position indicated by said order, the instantaneous speed and acceleration of the movement being determined by the instantaneous value of the position error. More particularly, the servo-systems and the way according to which they are fed by the digital-to-analog converter 101 are generally of the type described in the patent application No. 400,986 filed on Oct. 2, 1964 by the applicant.

Therefore, it is clear that, according to the invention, the servo-systems receive position orders at a rate depending on the succession rate of the interpolating cycles.

In a preferred embodiment, each displacement axis of the machine-tool is provided with a digital-to-analog converter, which is fed an input by the digital signal computed by said interpolating unit and feeds an output analog control signal to a transducer controlling the movement of the movable part of said machine along the corresponding displacement axis.

If said transducer is a cyclic position measuring transformer, to position the movable part of the machine it is sufficient to numerically specify the absolute position inside each cycle or pitch of said position measuring transformer. The use of a cycle position measuring transformer for each displacement axis reduces the number of binary digits necessary to represent all possible positions of the movable part along said axis. For example, by using a position measuring transformer of the type described in the U.S. Pat. No. 2,799,833, comprising a fixed multipolar winding and a pair of movable windings joint to the movable part of the machine, the position of said movable part can be represented by the relative displacement, expressed in electrical angles, between the fixed winding and the movable windings. Supposing the polar pitch of the fixed winding equal to 2 mm. and wanting for the position an approximatiol equal to 1/$\mu$m., inside each pitch the positions comprised between 1/$\mu$m. and 2 mm. will be expressed with the 10 least significant binary positions of the number representing the value of the coordinate; the other most significant binary positions of said number may be disregarded in order to represent the position along the relevant axis, because they specify only the number of whole pitches of the position measuring transformer already travelled.

In another preferred embodiment, a single converter for all the displacement axes can be used. In this case it is necessary to send the information signals to the transducer relating to the different displacement axes according to the known time-division art. That is the axes are cyclically addressed for sending thereto the corresponding signals; therefore, the information signals relating to a same time instant are routed to the different axes during successive time instants. This fact is symbolically represented on FIG. 15, wherein the switches 105X, 105Y and 105Z should be thought cyclically closed to feed the digital-to-analog converter 101, and, analogously, the switches 106X, 106Y and 106Z should be thought cyclically closed to feed the servo-motors 102, 103 and respectively 104.

With reference again to the case concerning only two displacement axes Y and X, it is clear that in said time-division system it occurs that, though the single digital-to-analog converter 101, the value of the coordinate $yn$ is sent to the transducer of the servo-system relating to axis Y with some delay after sending the value of the coordinate $xn$ to the transducer of the servo-system relating to axis X. In order to compensate this delay, during each interpolating cycle a corrective increment is added to the value computed for the coordinate $yn$, before sending said value to the transducer of the servo-system relating to axis Y through the converter 101. For example, in the case which is described later, wherein said delay is equal to half interpolating cycle, said corrective increment is equal to 0.5 $Dyn$.

In fact, equivalent arithmetic process is adopted, i.e. the following sum is executed:

$$2yn + Dyn \qquad (11)$$

and the weight of each binary digit, numerically representing the sum (11), is then divided by 2.

The arguments, so far developed for the case concerning only two displacement axes X and Y, can be immediately applied to the case concerning three displacement axes X, Y and Z.

More particularly, a formula analogous to (1) must be satisfied by the coordinates $xn$ and $zn$. Moreover the coordinate $zn$ will be subjected to all the operations and the comparisons before examined in the description of the interpolation method. Moreover, in the case concerning three axes, a type of correction, as before explained in connection with the Formula 11 for axis $y$, will be executed on both axes Y and Z, choosing of course suitable values for the corrective increments of the two coordinates $y$ and $z$.

More particularly, the corrective increments for axes Y and Z are chosen equal to a fraction of the increment accumulated during the preceding interpolating cycle. This fraction is chosen equal to the fraction of the interpolating cycle corresponding to the delay between the time instant wherein the servo-system relating to axis Y, respectively Z, is fed and the time instant wherein the servo-system relating to axis X is fed.

MEMORY

The interpolating unit comprises a cyclic memory constituted by a delay line LDR (FIG. 12), e.g. of the magnetostrictive type, having a delay equal e.g. to 2.4 ms. More particularly, the memory is of the type described in the patent application No. 435,877 filed on Mar. 1, 1965 by the applicant. Therefore it will be here briefly described. Bits having a period equal to 1$\mu$s. are memorized in said delay line, which therefore can contain at most 2400 bits.

A timing unit associated with each bit coming out of the delay line, a special digit specifying the position of the bit inside the memory.

Figure 6:
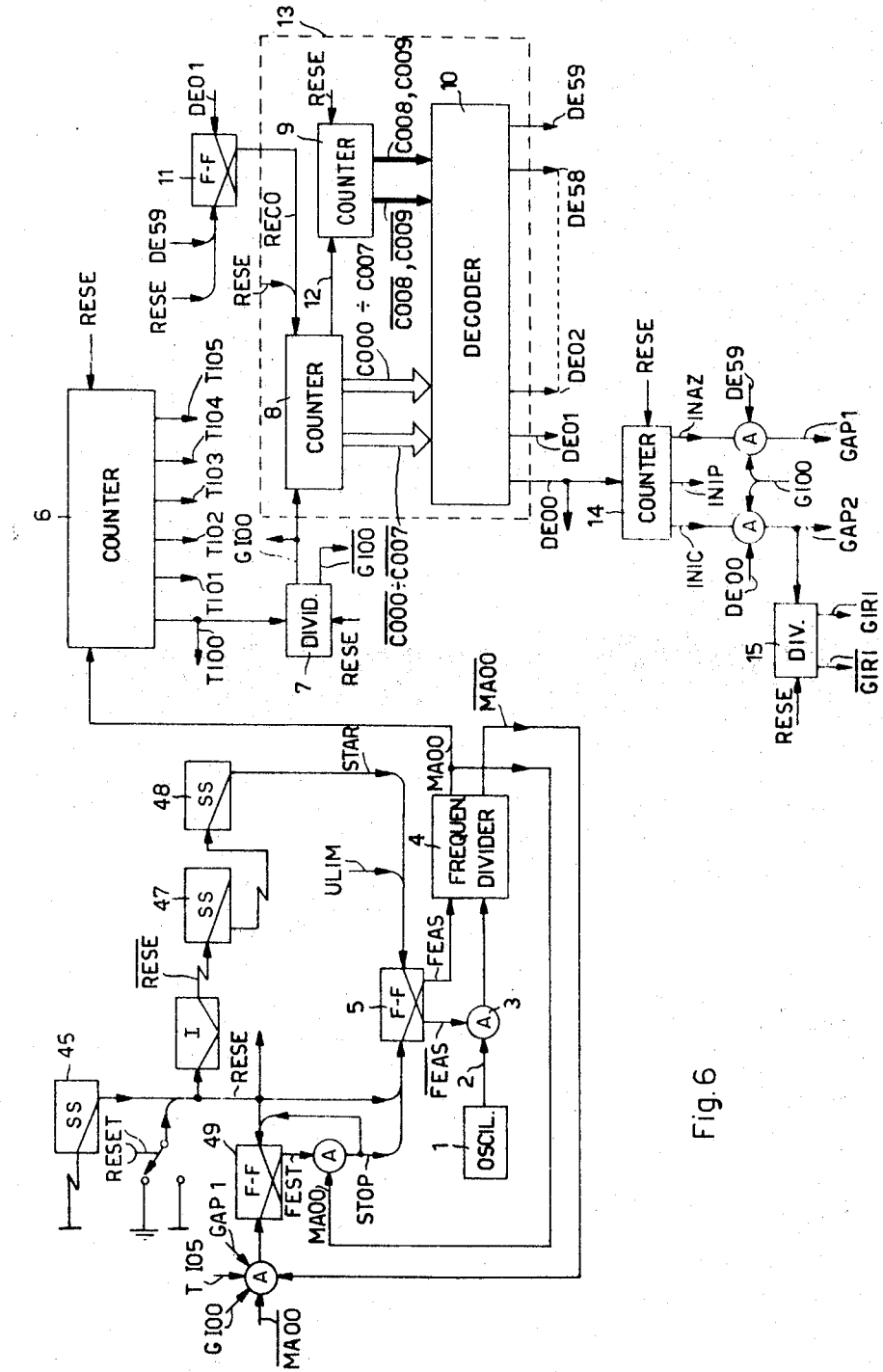
FIG. 6 shows the timing device comprised in the interpolating unit of the device according to the invention.
Figure 16:
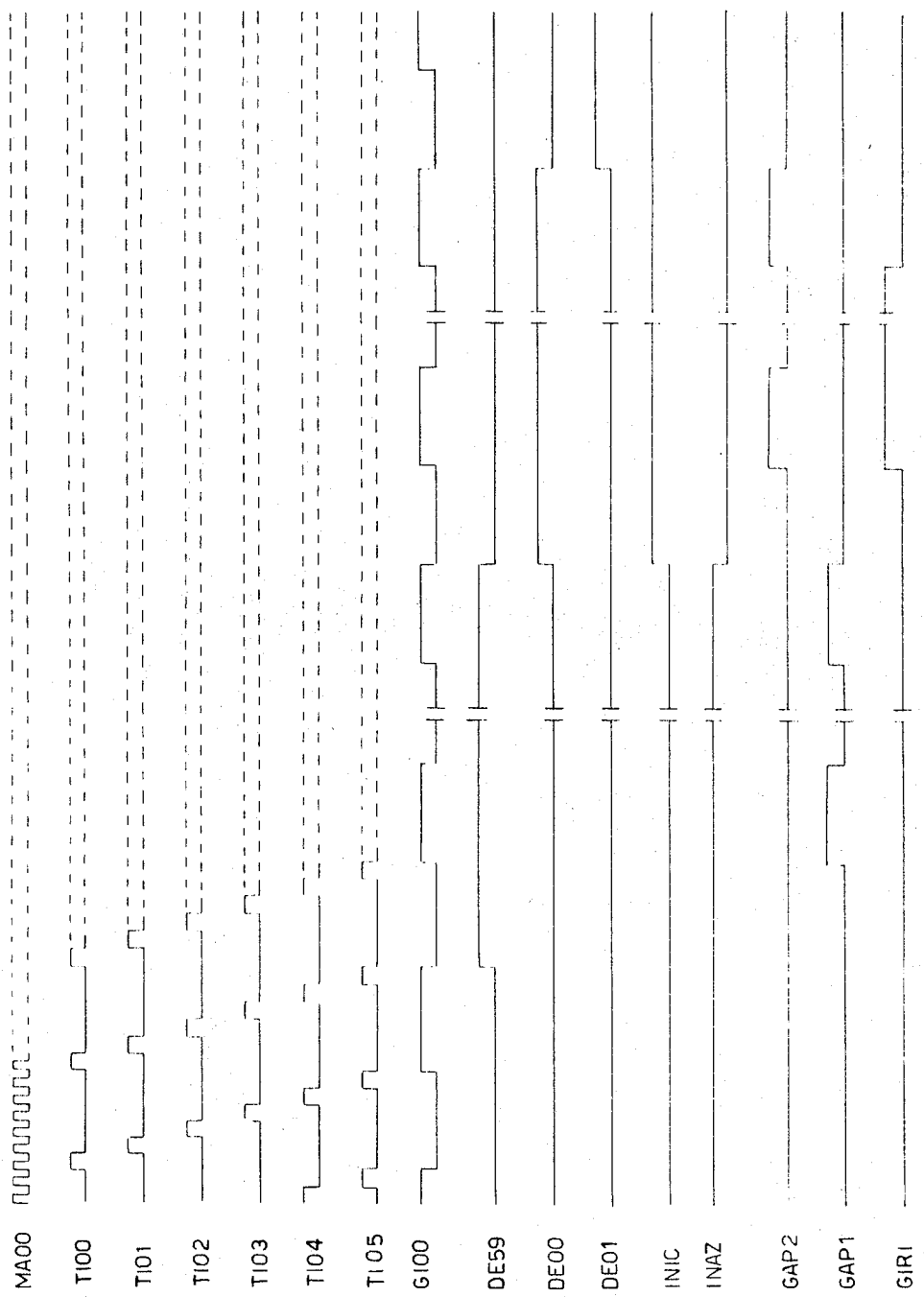
FIG. 16 shows a time diagram of the principal signals furnished by the timing device, comprised in the device according to the invention.

The timing of the delay line LDR is controlled by a quartz oscillator 1 (FIG. 6), having a frequency equal e.g. to 8 mHz., which feeds a frequency divider 4. This divider feeds, on the output MAOO, a square wave (FIG. 16) having a period equal to 1 μs. The counting of the divider 4 may be stopped by blocking the output 2 of the oscillator.

The delay line LDR is not entirely filled with the bits circulating therein; the information bits to be memorized in said delay line are only 2160, which at the nominal frequency equal to 1 mHz. occupies only 2160 μs with respect to 2.4 ms. corresponding to the proper delay (length) of the delay line.

The frequency divider 4 is activated from the first bit going out of the delay line LDR, when the gate 3 is activated by the output $\overline{FEAS}$ of the flip-flop 5, which is deenergized by the output signal ULIM of the delay line LDR or by a signal STAR specified later. After the timing counter has counted all the 2160 binary denominations of the memory, a signal STOP is produced, which deenergizes the flip-flop 5 and energizes the output FEAS, which in turn zeroizes the contents of the divider 4. Therefore when the counting of the bits of the delay line LDR is not activated, said divider 4 remains permanently zeroized.

The output MAOO of the frequency divider 4 defines the successive bit periods having a length equal to 1 μs. The divider 4, as already explained, counts 2160 bit periods during each memory cycle. Each pulse MAOO defines, in a way explained later on, the time during which a bit is read out or written into the delay line. Therefore the system comprising the oscillator 1, the divider 4 and the circuit 3, 5 used for stopping the frequency divider, is apt to define, during each memory cycle, 2160 binary denominations and to keep void a position of the delay line whose length varies according to the variations of the real delay of the delay line.

Figure 12:
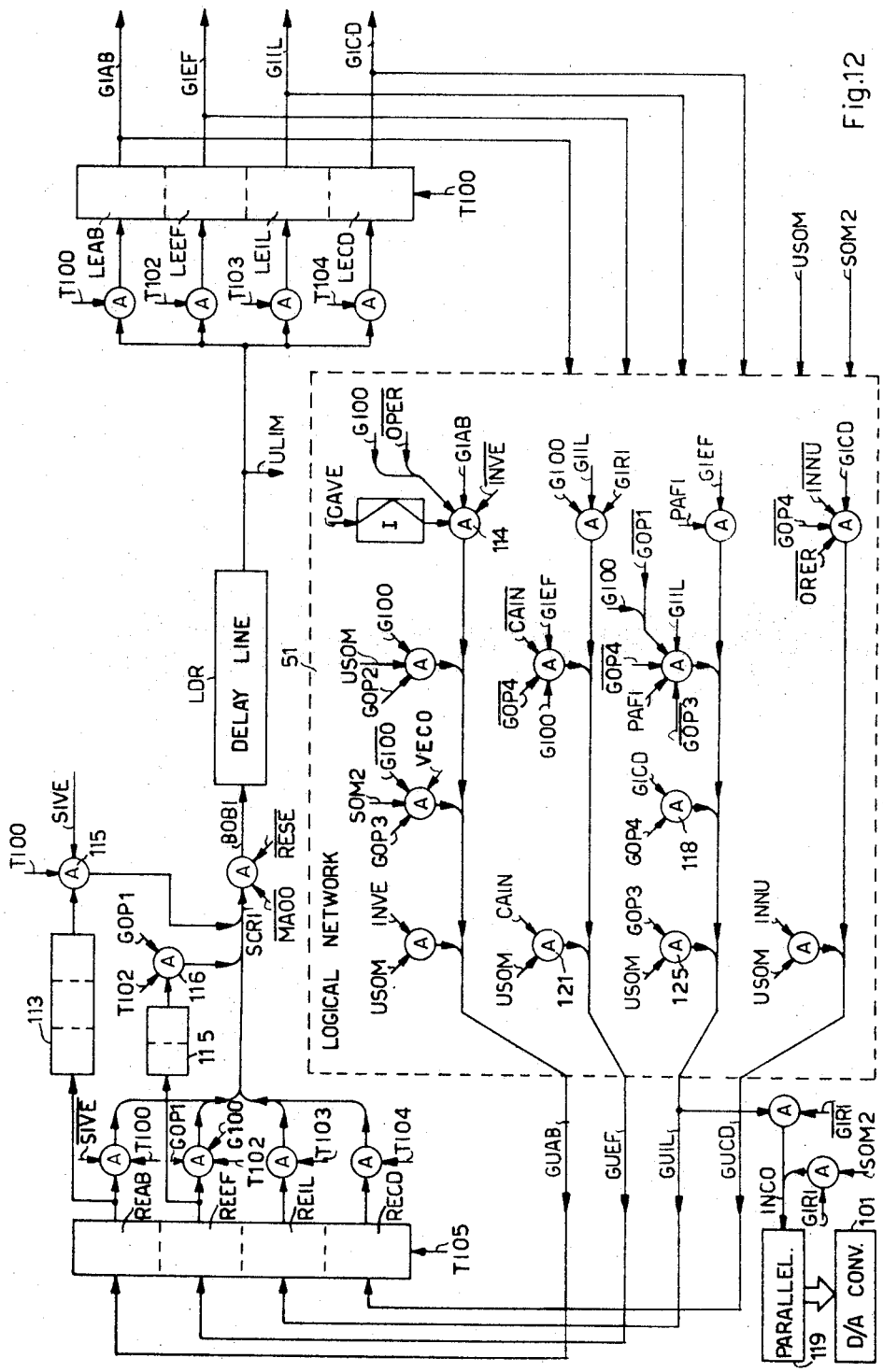
FIG. 12 shows the memory, equipped with reading and writing registers, of the device according to the invention.

The output MAOO controls a counter 6 provided with six outputs TI00 to TI05, which activate the inputs of the output register LEAB, LEEF, LEIL, LECD (named staticizing registers or reading registers) of the delay line (FIG. 12). Said outputs TI00 to TI05 are activated in a cyclic succession, each one during a period equal to 1 μs. As will be specified later on, the counter 6 operates to time the serial-to-parallel conversion and vice-versa of the bits contained in the delay line LDR. When the output MAOO is not activated, the counter 6 stays in the zero condition (output TI00 energized and all the other outputs deenergized).

A binary counter (DIVID) 7, fed by the signal TI00 of the register 6, activates in turn two utputs GI00 and $\overline{GI00}$ specifying two different cycles of said counter 6 (each having a period equal to 6 μs.).

In this way 12 information bits may be routed towards the reading registers of the delay line LDR, six during a first cycle of said register 6 specified by the signal G100="0" and six during a successive second cycle of the register 6 specified by the signal G100="1." The 6 bits routed to the six reading registers during said second cycle, represent binary digits having the same weight and pertaining to 6 different numbers than those routed to the respective registers during said first cycle. Thus the value of 12 different quantities is represented.

Said 12 bits, having binary weights equal between them, are serially memorized in the delay line LDR, each one of them representing the binary digit of a determinate binary denomination for each of said 12 numbers respectively; other 12 bits having binary weights equal between them, each one of them representing the binary digit of the immediately lower binary denomination for each of said 12 numbers respectively, are serially memorized in the delay line LDR after said first group of 12 bits, and so on. Therefore, the digital values of the 12 calculation quantities are recorded in LDR in an interlaced form.

More particularly, the memory comprises 12 registers A, B, C . . . N for each axis X, Y, Z, each of said registers comprising 60 binary denominations DE00 through DE59, in all precisely $3 \times 12 \times 60 = 2160$ binary bits. Therefore, indicating by DEnK the nth binary denomination of the general register K, the arrangement of the binary denominations in the delay line will result, for each axis, as follows: D00A, DE00B, DE00C, . . . DE00N; DE01A, DE01B, DE01C . . . DE01N; . . . DE59A, DE59B, DE59C . . . DE59N. Three groups of $12 \times 60$ bits so disposed, relating to three axes, are arranged one after the other on the delay line.

The way adapted to specify the binary denominations of the different registers will not be described in detail.

At every 12th μs. (period of the signal GI00) the output of the divider 7 controls the bit weight counter 13 to advance one step, so that it counts from 1 to 60 energizing separately and successively the outputs DE00 to DE59. The signal DE59 entails the energization of the output RECO of the flip-flop 11, which carries the counter 13 to zero, i.e. the output DE00 thereof is reenergized. The output RECO of the flip-flop 11 is then deenergized by the signal DE01 when the counter 13 starts counting. The time reference between some of the output signals of counter 13 and other timing signals is shown on FIG. 16.

The signals DE00 to DE59 specify, for each of the 12 registers of the memory LDR, the 1st, the 2nd, . . . and the 60th bit, i.e. the binary denominations 0 to 59.

The binary denominations 1 to 56, specified by the signals DE01 to DE56 respectively, are used to represent the digital values $2^{-31}$ to $2^{-24}$ (i.e. the decimal values $10^{-10}$ to $10^7$), which is more than enough to represent all the positions comprised between 1 μm. and 10 m. with the requested approximation $2^{-24}$ μm. Therefore, the 33rd position specified by DE33 corresponds to the value 1 μm. DE00 is the first position, DE01 through DE32 represent the values $2^{-31}$ to $2^{-1}$ respectively and DE33 represents the value $2^0 = 1$. It is clear that in the memory registers all the quantities are represented by means of 56 bits.

All these 56 bits are computed during the arithmetic operations or during the transfer and comparison operations, performed by the interpolating unit. On the other hand, as more particularly specified later on, the data entered by the input unit are constituted only by 24 significant bits, representing, in the case said data are constituted by coordinates, the values 1 μm. to $10^7$ μm. Therefore, during the operation concerning the entry of data from the program unit to the memory, said 24 bits are entered into the 24 binary denominations corresponding to the weight of said bits, the remaining binary denominations on the right and the left side of said 24 binary denominations being filled with some zero bits. Thus, e.g. as shown on FIG. 17, the 24 bits of $x2$ (representing values comprised between 1 μm. and $2^{24}$ μm.) are entered into the register D, in the binary denominations from 33 to 56, specified by the signals from DE33 to DE56 respectively. Analogously the 24 bits D$x$M, representing the maximum increment and corresponding respectively to the values $2^{-13}$ μm. to $2^{10}$ μm., are entered into the register B in the binary denominations 20 to 43 specified by the signals DE20 to DE43.

It is also clear that, if the interpolating device according to the invention is applied to control a machine-tool, the range of the speeds, represented by the range of the values of D$x$M, is redundant and, for normal employments, it will be sufficient to use 14 significant bits in the denominations 30 to 43 to represent the values of the maximum increment comprised between $2^{-3}$ μm. and $2^{10}$ μm. Supposing that the output of a coordinate $xn$ from the interpolating unit occurs every 5th ms. (period of the memory cycle), corresponding speed values will be obtained comprised between 1.4 mm./minute and 12.288 m./minute sufficient for all the normal uses. Said values of the maximum increment can also be expressed in decimal form by means of five digits, stated in the general description.

The domination 57, specified by the signal DE57, is used to memorize the sign of the number. More particularly, as complements are used instead of negative binary numbers, the last named denomination will be used to distinguish a positive number from a complemented number.

The denomination 58, specified by the signal DE58, is used to store the carry-overs.

The denominations 59 and 0, specified by the signal DE59 and DE00 respectively, are free in all the memory registers and are employed to separate the registers pertaining to different axes, thus obviating the possibility for the carry-overs to pass from one axis to the contiguous one.

In the delay line LDR there are stored first all the information relating to axis X (in total 12×60=720 bits), then the information relating to axis Y (720 bits), and finally the information relating to axis Z (720 bits). Therefore, the binary denominations of the memory occupied for the three axes are on the whole 2160.

The counter 13 repeats three times the counting of the 60 binary denominations, one time for each address X, Y, Z. The times relating to the three addresses are specified respectively by the signals INIC, INIP and INAZ (FIG. 6), produced by a counter 14, energizing successively its outputs INIC, INIP, INAZ at the starting of each counting of the counter 13 (i.e. when the signal DE00 is present).

The signals GAP1 (logical product of the signals GI00, INAZ and DE59) and GAP2 (logical product of the signals GI00, INIC and DE00) time, for each turn of the information on the delay line LDR, respectively the end and the beginning of the same information.

A counter (DIV) is controlled by the signal GAP2 activating its outputs GIRI and $\overline{GIRI}$ alternatively. Therefore, the period of the signal GIRI is equal to 2 turns of the information along the delay line LDR, and this period characterizes the time of an interpolating cycle.

We now note that the signal STOP, determining the stop of the counters 6, 7, 13, 14 and 15, is activated only at the end of counting the 2160 information bits stored in the memory; i.e., when the coincidence of the signal GAP1, GI00, TI05 occurs in the presence of $\overline{MA00}$ (second half period of the signal generated by the divider 4), the flip-flop 49 is energized and therefore its output FEST is activated. At the successive signal MA00, which carries to zero the counters 6, 7, 13, 14 and 15, the signal FEST can generate the stop signal STOP, energizing the flip-flops 5 and consequently deactivating its output $\overline{FEAS}$ and moreover resetting the flip-flop 49. Thus the signal from the oscillator 1 to the divider 4 is gated off.

The counter 13 is constituted by two counters 8 and 9 and by a decoder 10. The counter 8 is constituted by eight binary stages, each one having two outputs (a positive and a negative one); i.e. its outputs are in the whole 16, C000 to C007 and $\overline{C000}$ to $\overline{C007}$.

Said counter 8, counting up to 16, through a connection 12 controls the counter 9 by sending a counting pulse every 16th period of the signal GI00. Said counter 9 counts up to 4 and it is constituted by two binary stages, each one having two outputs, i.e. the outputs are in the whole four, C008, $\overline{C008}$, C009 and $\overline{C009}$.

The decoder 10, through a suitable combination of the 64 outputs of the counters 8 and 9, provides the 60 outputs DE00 to DE59 for the counter 13. When the output DE59 is activated, the counter 8 is carried to zero, so that a counting up to 60 is really obtained.

The registers of the memory have corresponding binary registers staticizing the writing data (on input) and the reading data (on output). Considering only 8 memory registers A, B, C, D, E, F, I and L, 4 of said memory registers (A, E, I and C) are specified by the signals TI00, TI02, TI03 and TI04 respectively during the half period specified by GI00="1," while the remaining 4 memory register (B, D, F and L) are still specified by the same signals TI00, TI02, TI03, and TI04 respectively during the half-period specified by GI00="0." Thus 4 binary staticizers are sufficient both for reading and for writing the memory data, said staticizers operating as registers named A, E, I and C during a first half-period and registers named B, F, L and D during a second half-period.

Therefore (see FIG. 12) 4 writing reigsters (REAB, REEF, REIL and RECD) will be present, whose inputs are activated only in the presence of the signal TI05 and whose outputs are activated respectively by the signals TI00, TI02, TI03 and TI04, and also 4 reading registers (LEAB, LEEF, LEIL and LECD) will be present, whose inputs are activated only in the presence of the signal TI00 and respectively by the signals TI00, TI02, TI03 and TI04.

The logical sum of the outputs of the four writing registers REAB, REEF, REIL and RECD feeds the signal SCRI, which strobed by the signal $\overline{MA00}$ becomes the signal BOBI going in the memory LDR. The output of the delay line LDR feeds the signal ULIM supplying the four reading registers LEAB, LEEF, LEIL and LECD. The output GIAB, GIEF, GIIL and GICD of each of said reading registers respectively, through the transfer unit 51, goes to activate respectively the input GUAB, GUEF, GUIL and GUCD of the corresponding writing register.

Figure 13:
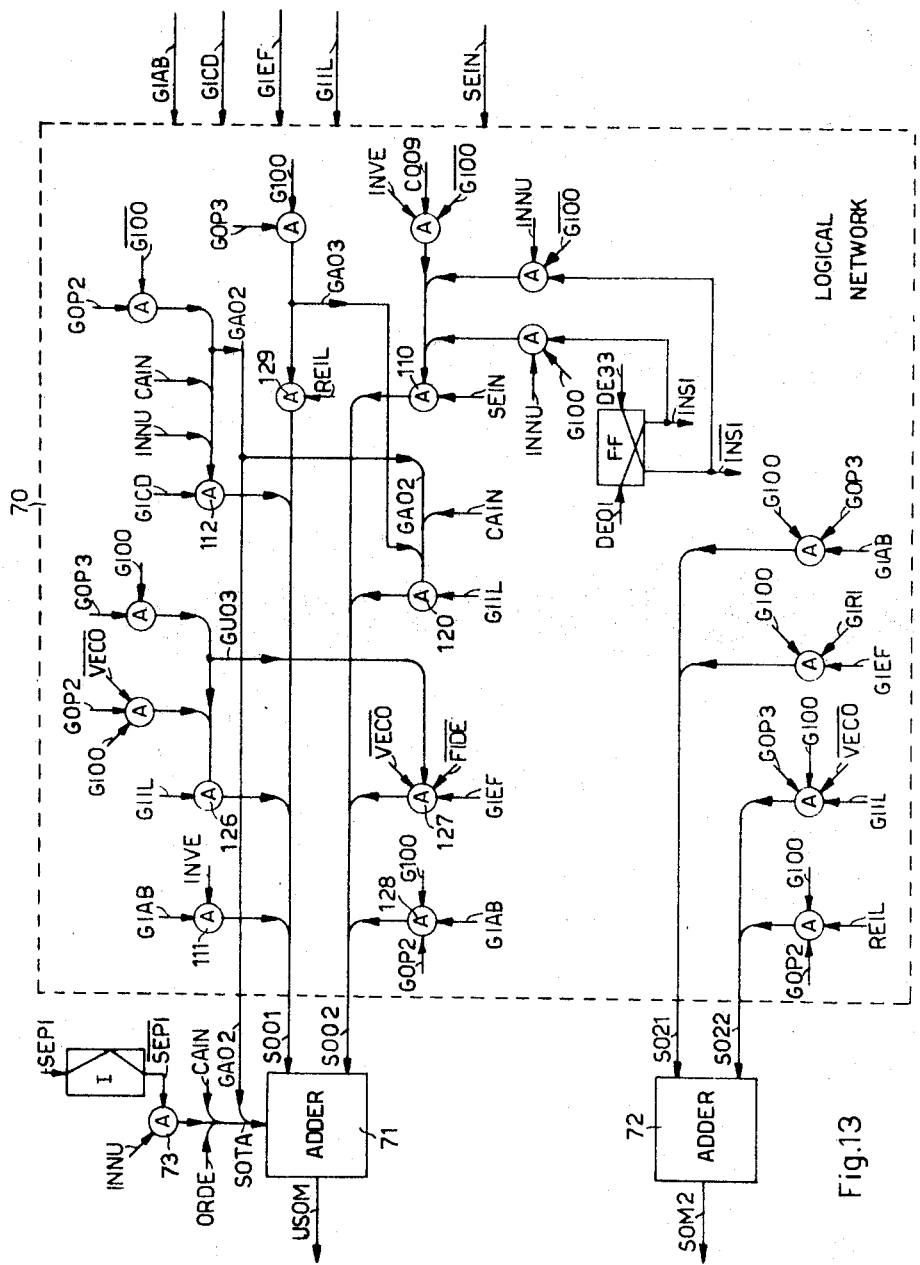
FIG. 13 shows two adders comprised in the device according to the invention.

Moreover said outputs GIAB, GIEF, GIIL and GICD feed two adders 71 and 72 through an input block 70 (FIG. 13).

Therefore, it is clear that the writing registers REAB, REEF, REIL and RECD together with the associated units constitute a parallel-to-serial converter feeding the delay lines LDR, while the reading registers LEAB, LEEF, LEIL and LECD together with the associated units constitute a serial-to-parallel converter fed by the delay line. Therefore, for the external computing units, the delay line is equivalent to a set of four parallelly recirculating registers A, F, I, C having inputs GUAB, GUEF, GUIL and respectively and outputs GIAB, GIEF, GILL and GICD respectively, plus another four parallelly recirculating registers B, F, L and D, having common inputs and outputs with the first four registers respectively and being six bit periods out of phase with respect to said first four registers.

With reference to axis X, the function of the memory registers is the following.

The register A is used, during the interpolation (FIG. 18), to accumulate $$\sum_{1}^{n} Dxn$$

obtained from the operation (4), i.e. the progressive distance ($xn-x1$) travelled.

The register B is used, during data entry from the program unit (FIG. 17), to store the maximum increment DxM (maximum admissible speed along axis X). The value DxM remains unchanged in the register B until the program unit enters another value.

The register C is used, during data entry from the program unit (FIG. 17), to store the coordinate $x2$ of the final point P2, displaced $\log_2 H=33$ binary positions towards the least significant binary positions. Therefore, the register C comes to contain the quantity $H \cdot x2$ used for calculating the speed increment $hx$.

The register D is used, during data entry from the program unit (FIG. 17), to store the coordinate $x2$ of the end point P2. This quantity remains unchanged in the register D during all the interpolation time, in order to allow the operation (6) to be executed for calculating the remaining distance still to be travelled.

At the end of the interpolation the contents of the register D are transferred to the register L and retained therein in order to be used as initial coordinate $x1$ for the next rectilinear segment. In fact it has been shown that the program unit feeds only the end coordinates of the rectilinear segments.

The register E is used to contain, during the interpolating time (FIG. 18), the speed increment $hx$.

The register F (relating to axis Y) is used during the interpolating time, to contain the quantity $2yn$ used for performing the correction according to Formula 11.

At the end of the interpolation time (FIG. 17), the quantity $H \cdot x2$ up to that time stored in the register C is transferred to the register I. Consequently the register I comes to contain the quantity $H \cdot x1$, which is valid for the next rectilinear segment to be travelled, as the end point P2 of a rectilinear segment coincides with the starting point of the successive rectilinear segment. The quantity $H \cdot x1$ is stored in the register I in order to allow the calculation of $hx$, which, as already described, is performed before starting the interpolation. Therefore, during the interpolation time (FIG. 18), the register I is free to contain the increments $Dxn$ as they are calculated.

The contents of the register L, wherein at the end of the interpolation the initial coordinate of the rectilinear segment to be travelled is entered from the register D as already stated, is continuously increased during the interpolation, so that the register L comes to contain the successive values of the instantaneous coordinate $xn$. Therefore, it is clear that the register L is apt to feed the servo-systems; in fact it is the only memory register whose output is connected to the converter 101.

Figure 17:
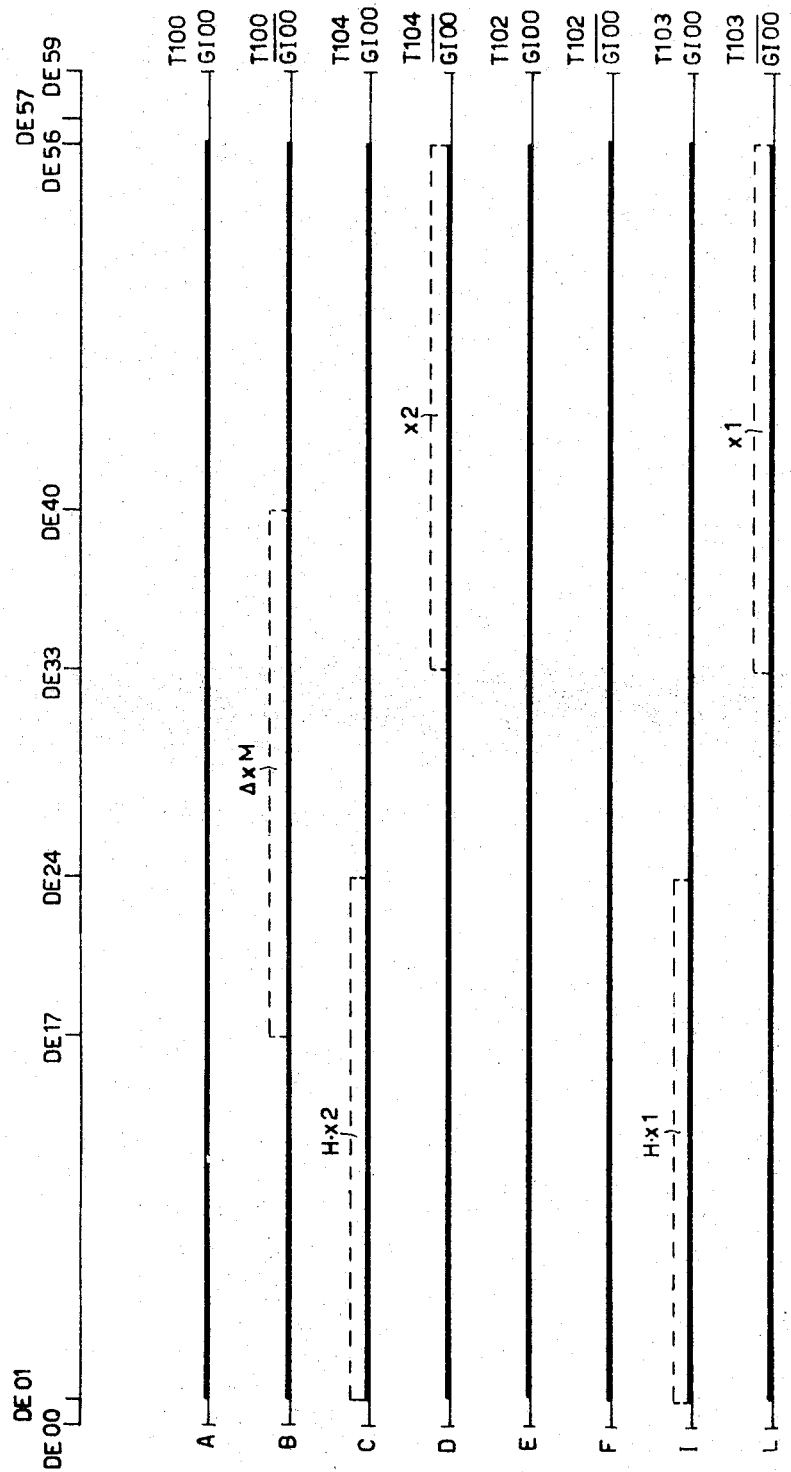
FIGS. 17 and 18 show, during two different time instants, the arrangement of the bits in the memory registers of the device according to the invention.
Figure 18:
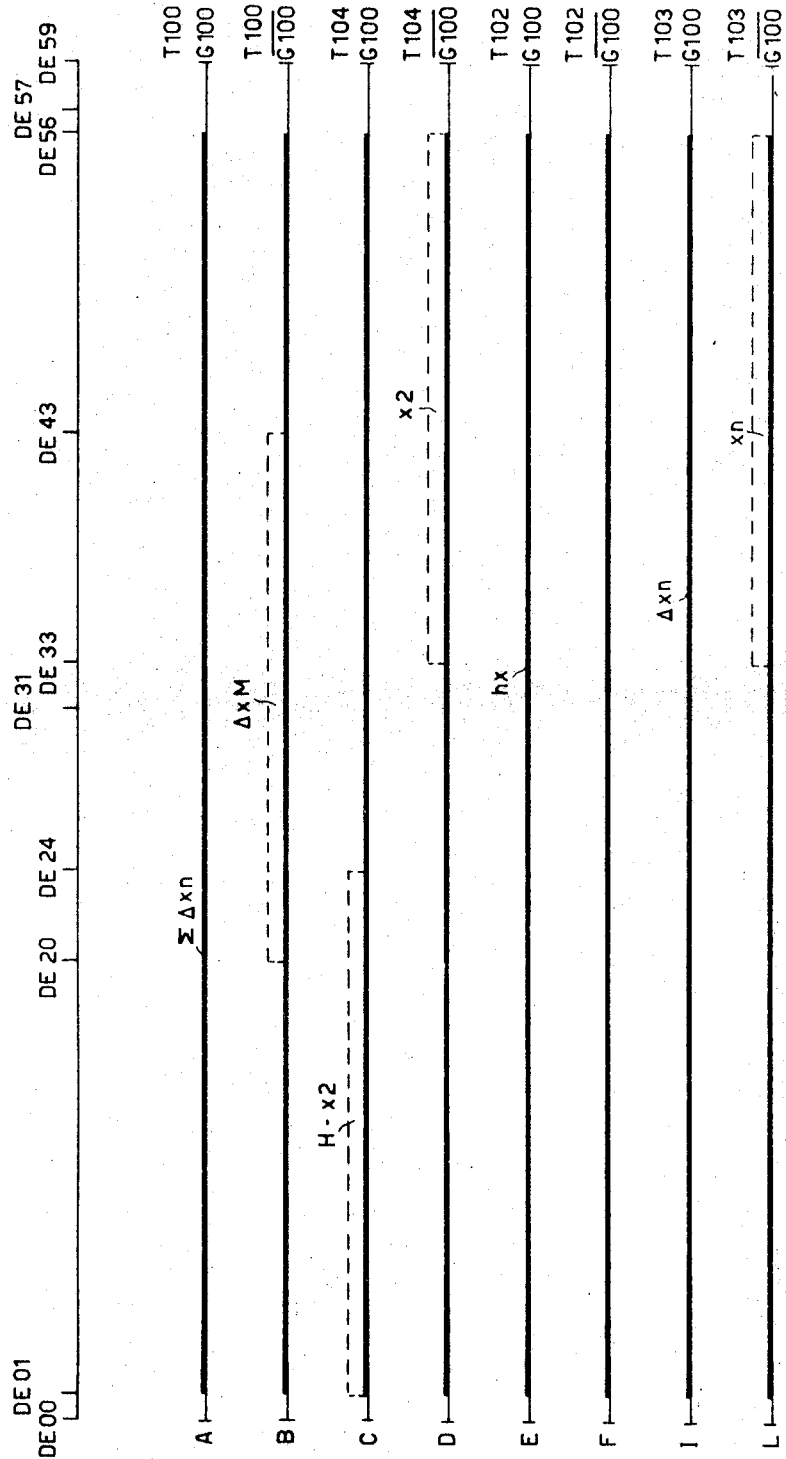

On the FIGS. 17 and 18 the dashed lines relating to registers B, C and D show the 24 contiguous binary positions, among the 56 binary positions of each register, wherein the relevant datum is entered from the proper unit, while the dashed lines relating to registers I and L indicates that the contents of the registers C and D are transferred respectively into the registers I and L in the corresponding binary positions, i.e. without any shifting operation.

The function and the contents of the registers relating to axes Y and Z are analogous to the ones explained for axis X.

CONTROL OF THE PROGRAM UNIT

During the automatic operation, the selectors 16, 17, 31 and 34 on the panel 50 (FIG. 7) are adapted to select the type of operation, have to be carried by hand on the position AUT.

When the machine is on, the operation of the pressbutton RESET generating the signal RESE carries to zero all the flip-flops and the counters.

The start of data entry from the tape 56 through the reader 57 and the decoder 58 is then produced by pushing the pressbutton START generating the signal PUVI, which activates the flip-flop 18. The output 19 of said flip-flop 18, through a monostable 20 and in the presence of the signal $\overline{\text{LELE}}$ from the tape reader 57 (FIG. 9) (i.e. when the tape is present in the reader and the latter is closed), activates the output VIMA of the flip-flop 21.

Figure 10:
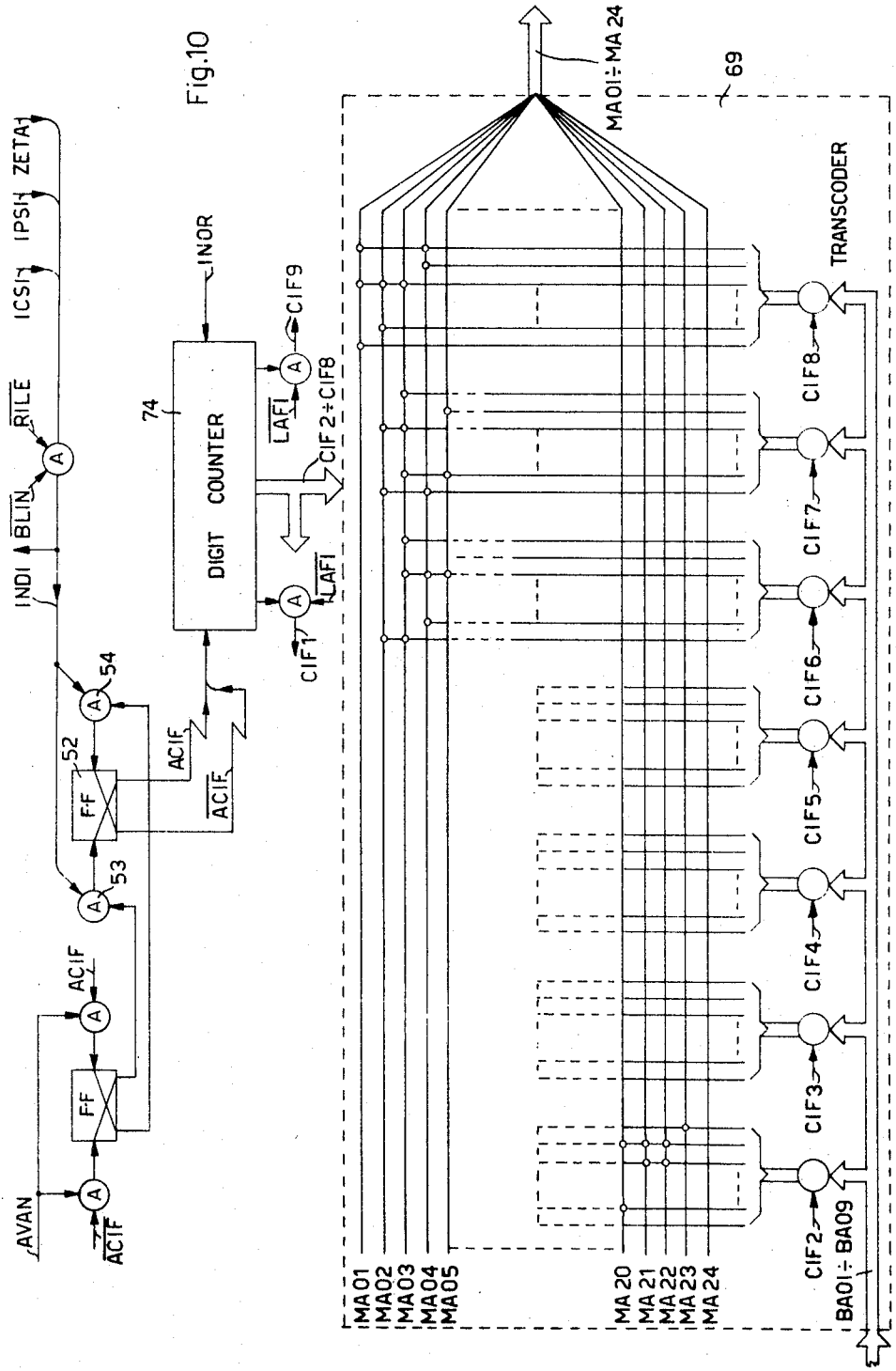
FIG. 10 shows a digit counter and a transcoder comprised in the device according to the invention.

As the selector 16 (FIG. 7) is on the position AUT, the signal VIMA activates the signal BOVI starting the chain of monostables 22 and 23. The output 24 of the monostable 23 activates the output UNIF of the flip-flop 25, so allowing the signal RILE (delaying the tape reading) to be generated on the homonymous output of the monostable 26. The signal RILE activates the monostable 27, on the output of which a signal AVAN is generated which controls the counting of the digit counter 74 (FIG. 10). Moreover (FIG. 7), the signal AVAN through a gate 35 becomes the signal AVAB controlling the feeding of the tape reader. This gate 35 is open in the presence of the consent signals $\overline{\text{RESE}}$ (lack of the general zeroizing signal), $\overline{\text{ORER}}$ (lack of reading errors) and AUTO (selection of automatic entering of data from the tape). The flip-flop 25 is deenergized, each time the tape reading delaying signal RILE fails, by the activated output $\overline{\text{RILE}}$ of the monostable 26 and by the contemporaneous deactivation of the output 24 of the monostable 23.

The signal AUTO is generated by the energization of the flip-flop 28, i.e. when the selection of the position AUT for the selector 17 produces the signal $\overline{\text{AUMA}}$ and the end calculation signal LAFI is present.

We note that in the present conditions said signal LAFI is present, because, at the end of the initial zeroizing operation generating RESE, a signal FINE is obtained which energizes the flip-flop 30 and consequently activates its output LAFI.

After energization the flip-flop 28 remains in this condition and, therefore, the signal AUTO is constantly present.

The signal BOVI goes also activating a flip-flop 29, thus deactivating its output signal $\overline{\text{BOAV}}$, so that the signal $\overline{\text{ORER}}$ is present, which maintains opened the gate 35.

The absence of the signal $\overline{\text{BOAV}}$ causes also the signal $\overline{\text{BOAU}}$ to be present, which releases the progress of the tape 56 in the reader 57.

The program tape 56 advances in the reader 57 one step each time under the control of the signal AVAB and, after stopping, the coded character facing the reader feelers is read.

The signal AVAN lasts e.g. 4.5 ms., i.e. a period sufficient to cause the tape to advance one step, while the signal RILE lasts more time, e.g. 15 ms., and, consequently, it delays the reading of the character after stopping the tape on the reading position allowing the feelers to prepare themselves on the tape.

Moreover the signal RILE deenergizes the flip-flop 21, so deactivating the signal VIMA and consequently the signal BOVI.

The flip-flop 18 remains energized and each subsequent operation of the pressbutton START has no effect.

Also the flip-flop 29 remains energized, so that the signal BOAV fails, and consequently both the signals $\overline{\text{ORER}}$ (keeping opened the gate 35) and $\overline{\text{BOAU}}$ (keeping released the reader 57) are present.

Next, the monostable 26 becomes deenergized, so generating the signal $\overline{\text{RILE}}$ which allows the reading of the first character on the tape.

Then, said first character is read, then decoded and, if it is an address character or an auxiliary order character, a corresponding signal is activated and staticized, while if it is a digit chaacter or a sign character, it is stored in the memory LDR.

In any case, at the end of the operations described in the preceding period, the control unit governing the interpolating unit produces a signal causing the tape to progress one second step and a new character to be read.

More precisely, the reading of an address character, giving rise to one of the decoded signals AUIC, AUIP and AUIZ, in the presence of the signals $\overline{\text{RILE}}$ and $\overline{\text{BOAU}}$ produces the signals AVNA controlling the progress of the tape analogously to the signal BOVI. The reading of auxiliary order characters AUX1, . . . , AUXN (or even the reading of void characters, i.e. white tape or holes on all the tracks) gives rise to the signal ORAU originating the signal AVNA analogously to the preceding case. The reading of a digit character or of a sign character requires their storage in the memory LDR; at the end of this storage operation a signal ANO1 is generated producing a progress of the tape analogously to the signals BOVI and AVNA. Also the reading of a speed character gives rise to a signal ANO1 still producing a progress of the tape. The generation of said signal ANO1 is described in the following chapter concerning data entry by a program tape.

The reading of the block end character CR, which is also an interpolation starting character, produces the decoded signal AUVI which generates no particular signal for the progress of the tape. Therefore, the tape rests on the position of the last read character during all the time employed by the control device to perform the interpolation and the corresponding positioning of the movable part of the machine.

At the end of the operations concerning interpolation and positioning for a program block, the signal FIPA is generated (as described in the chapter relating to the interpolation operations), which, through the selector 31 positioned on the position AUT, activates the signal ANO4, controlling again the tape to progress one step analogously to the signals BOVI, AUNA and ANO1.

At the end of the complete program the reader 57 reads an auxiliary character, decoded as signal AUXM, which deenergizes the flip-flop 18 and also the flip-flop 29, whose ouput $\overline{BOAV}$ becomes activated so as to generate the signals BOAU (blocking the reader) and ORER (deactivating the gate 35 and deenergizing the flip-flop 30).

We note that flip-flop 30 is deenergized through the signal INOR each time an address character or an auxiliary order character is read, and it is energized through one of the signals FINE (end of an interpolation stroke) and ORER (error or program end).

Therefore, the end calculation signal LAFI is absent during the time employed by the control device for the interpolation operations preventing manual operation on the selectors 16, 17 and 31 from having any effect on the control device.

The presence of the signal LAFI (signaled by a lighted lamp 36), at the end of an interpolation stroke and at the occurrence of an error signal, allows the program unit to pass to the type of operation wherein the data are entered by manual setting up (i.e. selectors 16, 17 and 31 carried on the position CON): in fact, in this condition the signal AUMA is present and it deenergizes the flip-flop 28 activating its output $\overline{AUTO}$. This last activated output activates the signal VEMA or POMA (according to whether the selector 32 is in the position VEL or respectively in the position POS) permitting data entry from the setters 59, 60, 61 (relating to the speed) and 62 (relating to the position coordinates) (FIG. 9).

Also, a semi-automatic operation is possible, obtained by carrying the selectors 16, 17 and 31 on the position SING. The only change required with respect to the automatic operation is the absence of the signal ANO4 at the end of each interpolation stroke. Therefore, after each program stroke fed by the tape it is necessary for the operator to restart the reading of the data block relating to the following stroke.

For this purpose the program unit is provided with a fourth selector 34 generating a signal MASI when carried on the position SING. A signal GOP4 (defining the end of positioning the movable part during an interpolation stroke) through a gate kept open by the signal MASI can deenergize the flip-flop 18. A successive operation of the pressbutton START by the operator is active to energize the flip-flop 18 and consequently to restart the tape reader, analogously to the way already described.

Figure 8:
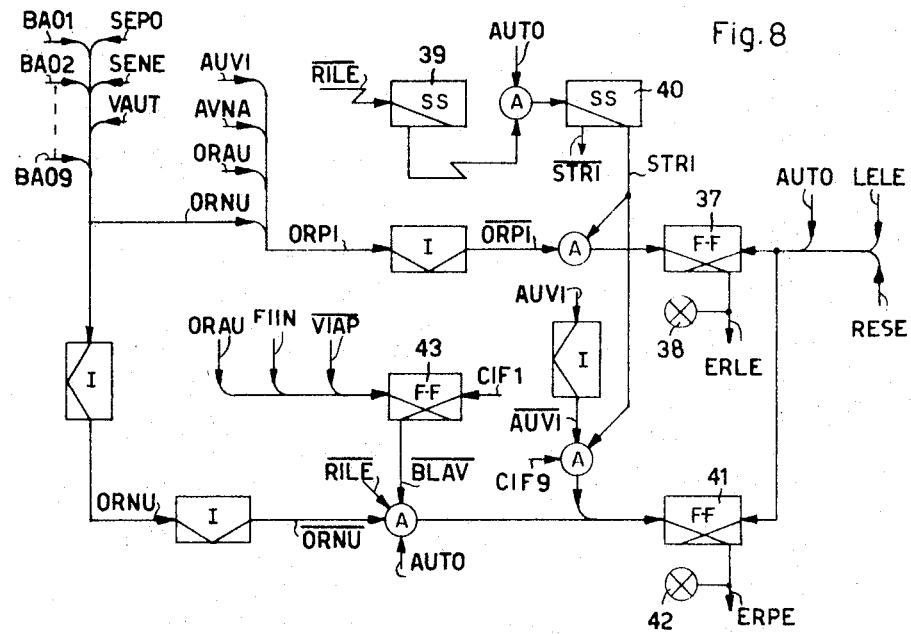
FIG. 8 shows a logical circuit for detecting the program reading errors, comprised in the device according to the invention.
Figure 9:
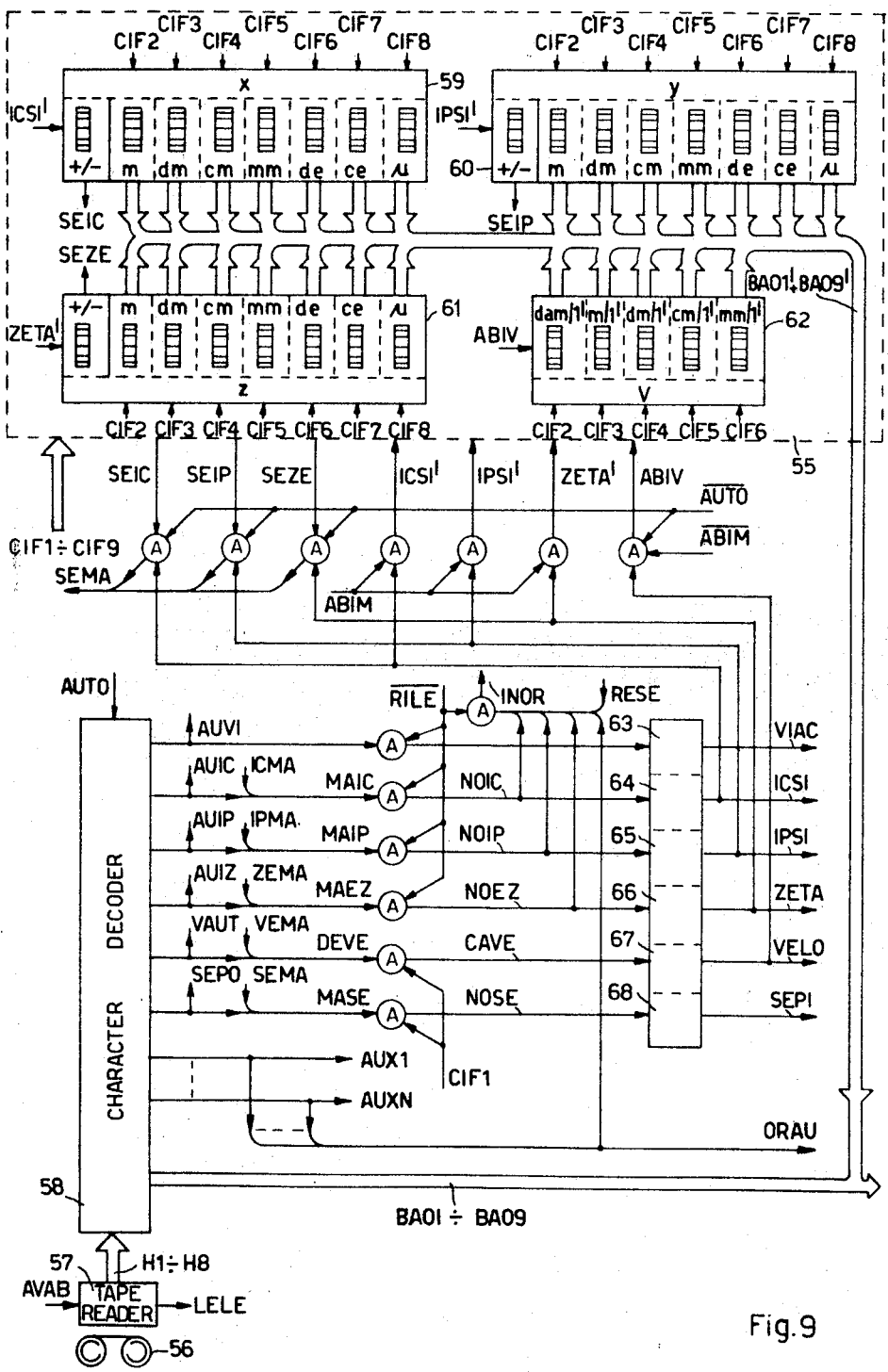
FIG. 9 shows the program unit of the device according to the invention.

During reading the characters some errors can occur producing the error signals ERLE and ERPE, which determine the stop of the tape reader (FIGS. 8 and 9).

If the reading of a character on the tape feeds no decoded signal on the output of the decoder 58 (FIG. 9), the signal ORPI ("OR" function of all the decoded tape signals) fails (FIG. 8), and consequently the activated signal $\overline{ORPI}$ strobed by the signal STRI energizes the error flip-flop 37, whose output ERLE becomes activated. This last activated output lights character error lamp 38 and, as already said, blocks the tape reader 57. The stroke signal STRI is obtained from the signal $\overline{RILE}$ delayed through a chain of monostables 39 and 40.

When a program reading error occurs (e.g. because the conditions that during the digit counting signal CIF1 to CIF8, furnished by the digit counter 74 (FIG. 10), only digit or sign or speed codes are to be read, and during the digit counting signal CIF9 of the same digit counter only the start code CR is to be read, are not observed) the flip-flop 41 is energized and its output ERPE becomes activated.

This last activated output ERPE lights reading error lamp 42 and, as already said, blocks the tape reader 57.

More particularly, the flip-flop 41 is energized by the signal $\overline{AUVI}$ (absence of the decoded start signal) occurring during the digit counting signal CIF9 and strobed by the signal STRI. Moreover, said flip-flop 41 is energized by the occurrence of the signal $\overline{ORNU}$ (absence of decoded signals relating to digit or sign or speed) strobed by the signal $\overline{RILE}$ in the presence of $\overline{BLAV}$. The signal $\overline{BLAV}$ is activated when the flip-flop 43 is deenergized by the occurrence of the digit counting signal CIF1. Said flip-flop 43 is then energized by one of the signals $\overline{VIAP}$ (activated by the energized flip-flop 18 in the presence of the signal AUTO), FIIN (end of data entering) and ORAU ("OR" function of the auxiliary order signals).

The flip-flops 38 and 41 are then deenergized by one of the signals RESE, LELE (reader open or void of tape) and $\overline{AUTO}$.

As it has been previously mentioned, the tape reader 57 when open or void of tape generates the signal LELE zeroizing the flip-flops 18, 29 (FIG. 7), 37 and 41 (FIG. 8) and blocking the energizing input of the flip-flop 21. Therefore, in this condition any operation on the pressbutton START has no effect and the progress of the tape is blocked.

Moreover the signal LELE energizes a flip-flop 44, whose output AVER remains activated: in this condition said activated output AVER gives rise to a signal BLIN which stops the digit counter 74, so blocking the entry of any sign or digit character. It is to be noted that the same signal BLIN is generated also by reading an address character or an auxiliary order character. The signal AVER is then dectivated by the signal INOR (FIGS. 7 and 9), i.e. by the signal RESE or by reading an address character or an auxiliary order character.

The signal AVER is also used for controlling the progress of the tape after an error. More precisely, when an error occurs, the signal BOAU is produced, blocking the tape reader 57. When the operator opens the reader 57 and checks the tape, eventually correcting it, if it is possible (e.g. if the error has been produced by one or more unshaped holes, the operator can correct these holes so as to make them valid). Successively, after removing the error causes, the operator positions by hand the tape in the reader on a middle character of the program block preceding the one which contained the error; then it shuts the tape reader and consequently the signal LELE is deactivated. By acting on the pressbutton START the operator reenergizes the flip-flop 29, so effacing the reader blocking signal BOAU. In this condition the signal AVER still present generates the signal AVNA entailing the progress of the tape till reading an address or auxiliary order character, which, as already explained, deenergizes the output AVER of the flip-flop 44. From this instant on, the normal functioning of the reader proceeds.

We note finally that, each time the machine voltages fall out of their tolerance limits for whichever trouble, the monostable 45 is energized, so generating the general zeroizing signal RESE which clears the control device.

ENTERING OF DATA BY A PROGRAM TAPE

Before starting the program recorded on a tape, it is necessary for the movable part of the machine to be positioned on the point chosen as program origin, which is generally chosen coincident with a zero position of the position measuring transformers.

For this purpose, after switching on the machine, the selectors 16, 17, 31 and 34 are positioned on the position MAN (FIG. 7): this breaks the connection between the automatic control device and the machine, and a manual control of the machine is then activated by the control panel. Therefore, a manual positioning of the movable part on the zero of the program, according to the criteria described in the patent application No. 444,207 filed on Mar. 31, 1965 by the applicant, is executed.

Next the selectors 16, 37, 31 and 34 are positioned on the position AUT.

At the beginning of the operations concerning the automatic data entering by a tape, the pressbutton RESET is pressed (FIG. 6), generating the signal RESE which produces the general zeroizing of the control device. More particularly, it resets the timing counters 6, 7, 8, 9, 14 and 15 and the bit weight counter 74 (through the signal INOR, FIGS. 9 and 10), and sets the flip-flops 5 and 11.

The signal RESE, delayed through the chain of monostables 47 and 48, generates the signal STAR which starts the cyclic operations of the delay line LDR. In fact (the LDR output signal ULIM being at present absent, as the delay line is uncharged) the output $\overline{FEAS}$ of the flip-flop 5 is activated by the signal STAR, so that the gate 3 is open and the oscillator 1 is connected to the divider 4. Thus the divider output MAOO is activated, and it starts the counter 6 from the rest condition (output T100 activated), in such a way as to activate successively and cyclically the six outputs T100 to T105, and, consequently, to start also the counters 7, 13, 14 and 15, as already described in the chapter concerning the memory.

The operator then pushes the pressbutton START (FIG. 7) energizing a series of flip-flops and monostables as described concerning the control of the program unit. At the end of these energizing operations the signal AVAN is activated, to control the bit weight counter 74 (FIG. 10), and consequently, through the open gate 35, the signal AVAB is generated, causing the tape to progress one step.

The program tape 56 (FIG. 9), made e.g. of a perforated paper tape, contains e.g. 8 parallel recording tracks, each character occupying 8 parallel positions on said tracks.

As already explained in the general description, in order to satisfy the requested approximation conditions and the requested maximum displacement, the values of the coordinates are represented by seven characters (i.e. seven decimal digits allowing distances comprised between 1 $\mu$m. and 10 m. to be represented) recorded on the program tape. For the speed values along the different axes, five characters (i.e. five decimal digits) are sufficient.

A standard data block, as already assumed in the general description, is constituted by characters as follows: an auxiliary order character (chosen among AU1 to AUN); an address character relating to a first displacement axis (e.g. IX); seven digit characters relating to said first displacement axis (e.g. K1X to K7X).

The next following data block may begin again with an auxiliary order character, or, on the contrary, it may begin with the address character relating to a second displacement axis (e.g. IY), followed by seven digit characters relating to said second displacement axis (e.g. K1Y to K7Y).

If the movable part of the machine should travel along more than two axes, said two data blocks are followed by other analogous blocks relating to the other displacement axes.

Said digit characters are recorded on the tape, always starting from the most significant digit.

At the beginning of the program it is necessary to record, for each axis, a data block defining the maximum speed admissible along the relevant axis. Said speed data block comprises the following characters: an initial address character relating to a displacement axis; a successive speed character (IV); five digit characters representing said maximum speed value relating to said displacement axis (K1V to K7V).

Said speed data block is repeated for each axis only when the relevant maximum admissible speed should be changed.

We will name "program block" a series of data blocks specifying the coordinates of the arrival point of the trajectory segment to be travelled by the movable part and the maximum speed values admissible along the different axes.

Each program block is ended by a block end character CR, which is also interpreted as a special character starting the interpolation operations.

The program tape progresses one step each time under the control of the progress signals AVAB, and the reader reads one character at a time.

The reading signals, through 8 reading channels H1 to H8, are transferred to a character decoder 58, which (activated by the signal AUTO) can activate one of its outputs. More precisely, it activates: one of its outputs AUX1 to AUXN, if the read character is an auxiliary order character AU1 to AUN, respectively; one of the outputs AUIC, AUIP, AUIZ, if the read character is an address character IX, IY, IZ, respectively; the output SEPO, if the read character is a sign character; the output VAUT, if the read character is a speed character IV; one of the nine outputs BAO1 to BAO9, if the read character is a decimal digit 1 to 9 respectively, as specified by the corresponding digit character K1X to K9X for the coordinate $x$, K1Y to K9Y for the coordinate $y$, K1Z to K9Z for the coordinate $z$, K1V to K5V for the maximum speed; the output AUVI if the read character is a block end character CR.

The outputs BAO1 to BAO9 feed a transcoder 69 (FIG 10).

The outputs AUX1 to AUXN feed corresponding auxiliary function control relays, while their "OR" function gives rise to a signal ORAU.

Figure 7:
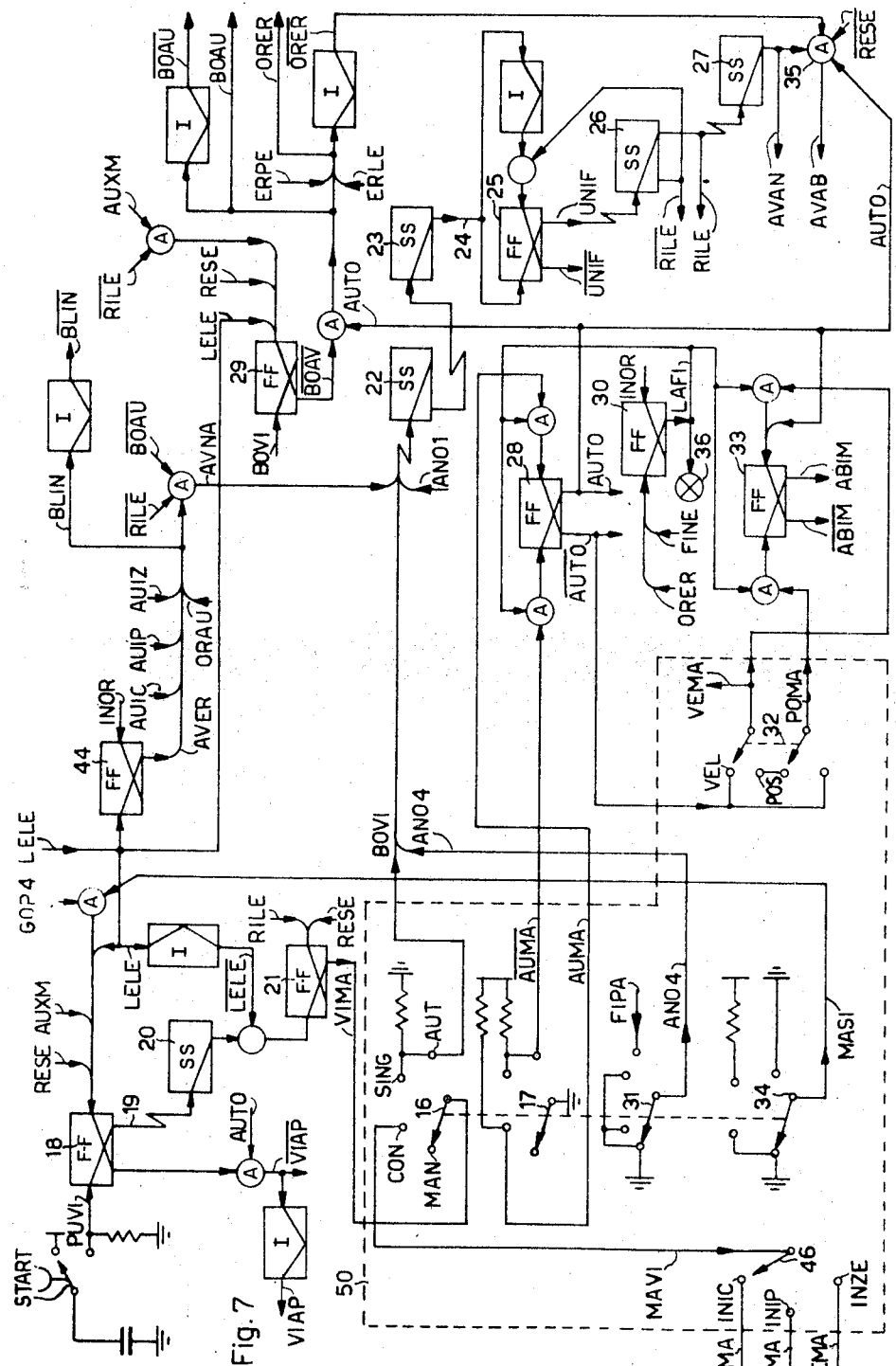
FIG. 7 shows the unit controlling the feeding of the program tape comprised in the device according to the invention.
Figure 19:
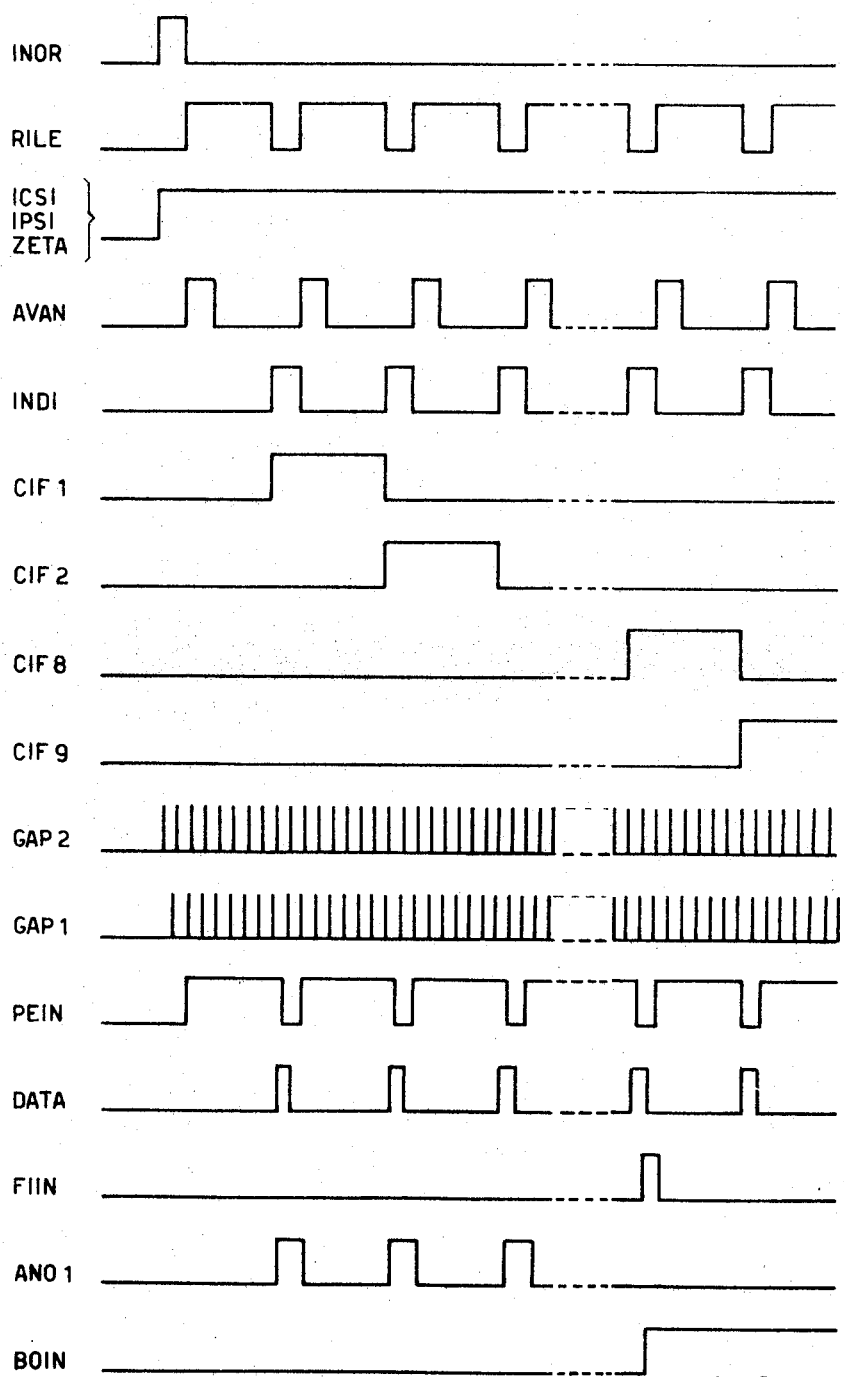
FIG. 19 shows a time diagram of the principal signals controlling the entering of data into the interpolating unit of the device according to the invention.

The outputs AUIC, AUIP and AUIZ activate the address signals MAIC, MAIP and MAEZ, respectively, which through corresponding gates, open by the presence of the signal $\overline{RILE}$, and corresponding inputs NOIC, NOIP and NOEZ are stored in the address staticizer 64, 65 and 66 respectively. Moreover, the "OR" function of the signals NOIC, NOIP, NOEZ, ORAU and RESE, in the presence of the signal $\overline{RILE}$, generates the signal INOR controlling the zeroizing of the digit counter 74 (FIG. 10) and of the flip-flop 44 (FIGS. 7 and 19). Each address signal remains in its staticizer till another address character is read. The "OR" function of the outputs ICSI, IPSI and ZETA activates the inputs of the flip-flop 52 (FIG. 10), i.e. it activates the counting of the digit counter 74.

The outputs VAUT and SEPO of the decoder 58 activate respectively the speed signal DEVE and the sign signal MASE, which through corresponding gates, open by the presence of the signal CIF1, and corresponding inputs CAVE and NOSE are stored respectively in the address staticizer 67 and in the sign staticizer 68. Said speed and sign signals remain in their relevant staticizers till new speed and sign characters are read.

The output VELO of the speed staticizer 67 conditions some gates, as described in detail later on, while the output SEPI of the sign staticizer 68 conditions the gate 73 (FIG. 13), so that it allows the adder 71 to selectively function as adder or subtracter.

When one of the outputs ICSI, IPSI and ZETA is activated, through a gate open by the presence of the signals $\overline{RILE}$ and $\overline{BLIN}$, after the tape is progressed one step, it generates the signal INDI which controls the alternate energization and deenergization of the flip-flop 52, through corresponding gates 53 and 54 open in the presence of the signal AVAN. Consequently the alternate activation of the two outputs ACIF and $\overline{ACIF}$ of said flip-flop 52, which are in "OR" function connected to the input of the digit counter 74, feeds a pulse to the last named input entailing said digit counter 74 to progress one step at a time, so that its outputs CIF1 to CIF9 are successively and cyclically activated.

We note that the consent signal INDI is interrupted only when the signal BLIN is present, i.e. when any auxiliary order signal is absent ($ORAU$="0") or none of the outputs AUIC, AUIP, AUIZ is activated.

Supposing that, after the first signal AVAB has caused the tape to progress one step, the first read character is constituted by white tape or by holes on all the tracks, a special output AUXL is activated and, consequently, also the signals ORAU and AVNA are activated, so as to cause the tape to progress one step more.

The operations repeat till a first address character is read.

Supposing that the first data block recorded on the program tape is represented by the following series of characters: IX, IV, K1V, K2V, K3V, K4V, K5V, /1X SX, K1X, K2X, K3X, K4X, K5X, K6X, K7X, we will now describe the operation of the control device during the automatic entering of the data represented by said characters.

After reading the character IX, the decoder 58 feeds the decoded signal AUIC which is then stored in the staticizer 64, while all the other staticizers 63, 65, 66, 67 and 68 are reset to zero. Moreover, said signal AUIC gives rise also to the signal AVAN, which controls the tape and the digit counter 74 to progress one step. Therefore said digit counter 74 counts so as to activate its output CIF1.

After reading the successive speed character IV, the decoder 58 feeds the decoded signal VAUT, which is then stored in the staticizer 67.

As one of the preceding signals AVAN has energized the flip-flop 74 (FIG. 14) and consequently the signal PEIN is present, after positioning the tape for the reading, the first signal GAP2 fed under these conditions by the timing unit activates the output DATA of the flip-flop 75.

In its turn, said activated output DATA (as the signals INDI, CIF8 and CIF9 are present) sets the flip-flop 76 activating the signal ANO1, which, as already explained, gives rise to a new signal AVAN and therefore the tape progresses one step more.

The flip-flop 76 is reset by the signals ORER, RESE and RILE, the latter being generated also by ANO1, while flip-flop 74 is reset by the "AND" function of the signals DATA and DE32.

The flip-flop 75 is reset by the signal GAP1 defining the counting end for the memory positions. Therefore said flip-flop 75 is energized during a complete memory cycle.

Moreover, the signal AVAN activated by reading the speed character IV controls the digit counter 74 to progress one step, so that its output CIF2 gets activated.

Successively, the first speed digit is read, and consequently a corresponding output among $BA01 \div BA09$ is activated, which represents in the decimal-binary code the value thereof. This decimal value feeds thereafter the transcoder 69.

Each digit entered into the transcoder 69 through the nine input lines BA01 to BA09 is then transferred on the 24 outputs MA01 to MA24 of said transcoder and represented in parallel by 24 bits. These 24 bits can represent numbers of 7 decimal digits. The transcoder 69, therefore, comprises 7 sections, each one able to transcode a digit of a determined decimal weight from the decimal-binary form to the pure binary form. The inputs of each of said sections are controlled by a corresponding digit signal among CF2 to CF8, specifying the weight of the entered decimal digit.

The 24 bits present in parallel on the 24 outputs of the transcoder 69 are then transferred to a serializer 78, to furnish said 24 bits in series on its output SEIN.

More particularly, the counters 8 and 9 (FIG. 6) time said serializer 78 through their outputs CO00 to CO07, and $\overline{CO00}$ to $\overline{CO07}$, and respectively CO08, $\overline{CO08}$. The counter 8 counts cyclically up to 16, while the counter 9 specifies four different counting cycles. Therefore, the outputs DE01, DE17, DE33, DE49 of the counter 13 are activated when the same output is activated in the counter 8, while a different output is activated in the counter 9. Analogous remarks are valid for other output groups of the counter 13, provided that these outputs are chosen with the same criterion.

The 24 bits of a speed digit are entered in the register B of the memory LDR in the denominations specified by the signals DE17 to DE40 (FIG. 17).

Figure 11:
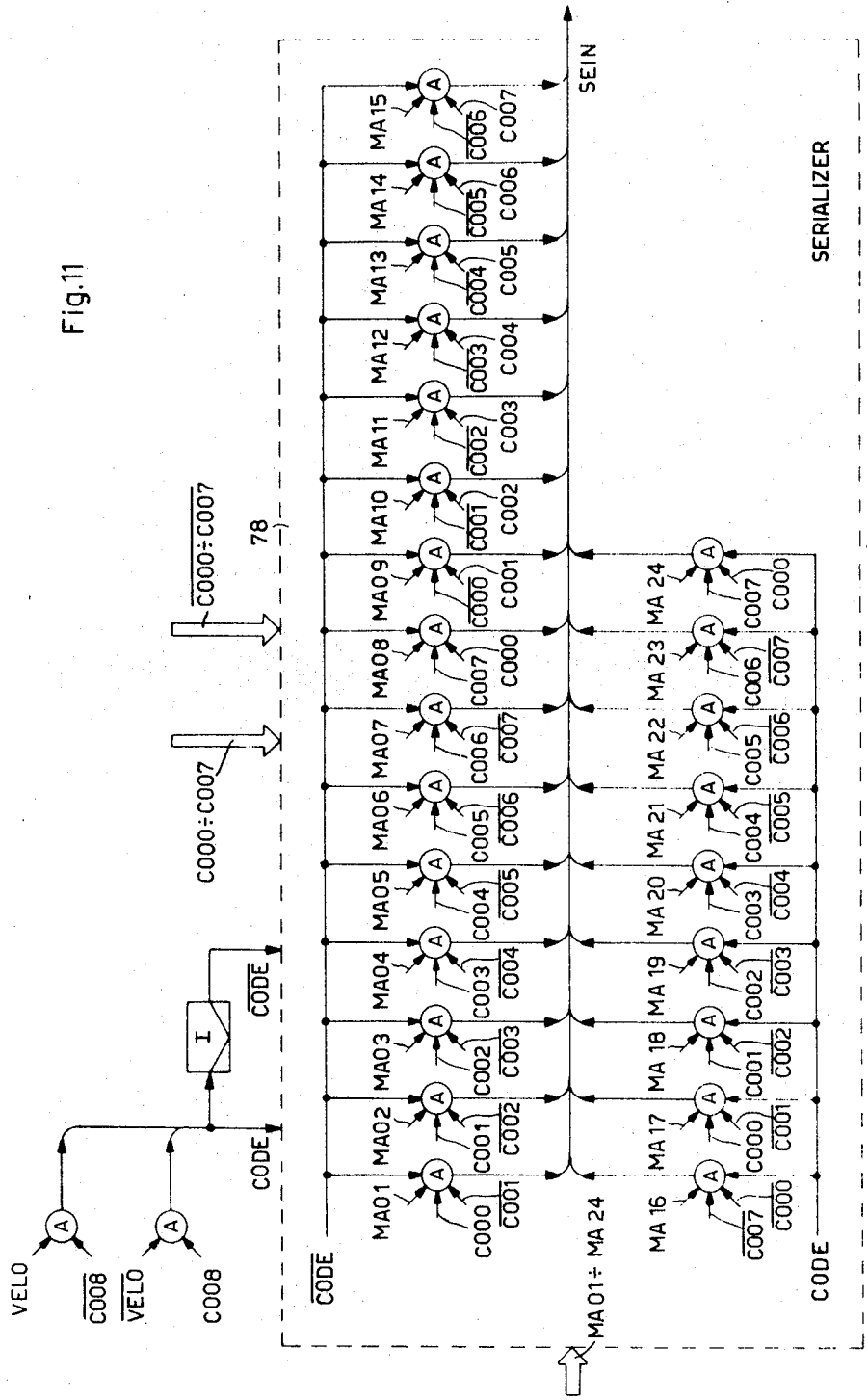
FIG. 11 shows a serializer comprised in the device according to the invention.

For this purpose a suitable logical circuit serializes the 24 bits of the transcoded digit only during the time interval occupied by the signals DE17 to DE40. More particularly (FIG. 11) if the signal VELO is present, during the first counting up to 16 of the counter 8 ($CO08$="1"), i.e. during scanning the first 16 inputs $MA01 \div MA16$ of the transcoder 78, the control input CODE is activated, so that it prevents the first 16 input bits from being transferred to the output SEIN of said transcoder 78. On the contrary, during the second counting up to 16 ($\overline{CO08}$="0"), the control input $\overline{CODE}$ is activated, so that said first 16 input bits are serially transferred from said successively scanned inputs $MA01 \div MA16$ to the output SEIN of the transcoder 78. Finally, during the third counting up to 16 ($CO08$="1"), i.e. during scanning the successive 8 inputs $MA17 \div MA24$ of the transcoder 78, the control input CODE is actiavted, so that the remaining 8 input bits are transferred from said successively scanned inputs $MA17 \div MA24$ to the output SEIN.

The output SEIN of the serializer 78 feeds the memory LDR through a logical network 70, an adder 71 (FIG. 12) and another logical network 51 (FIG. 12).

Figure 14:
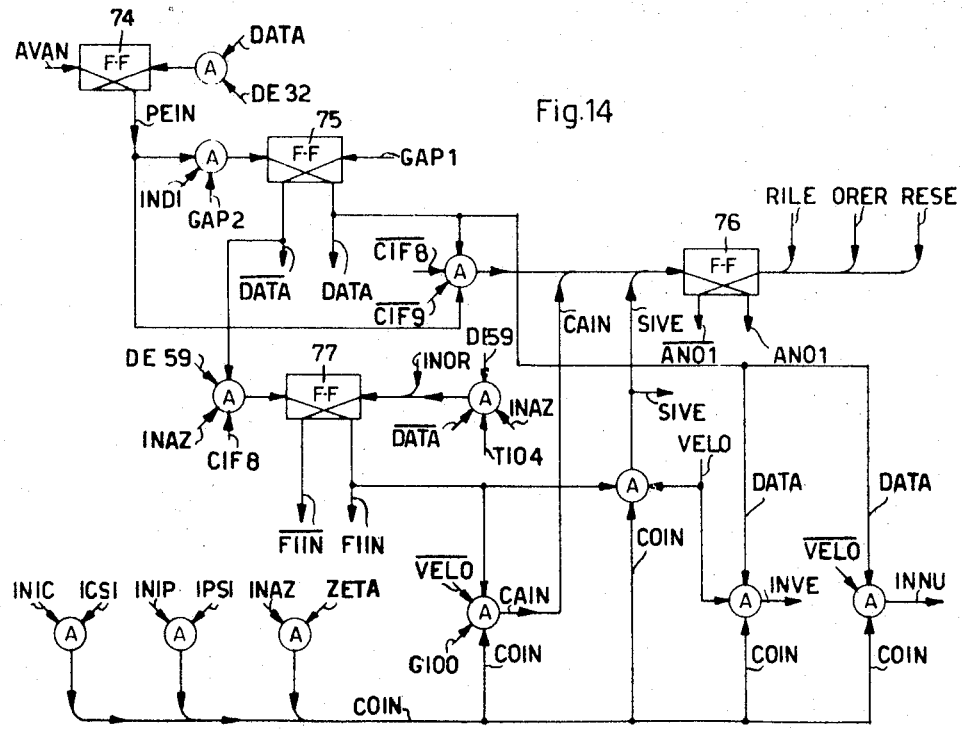
FIG. 14 shows a logical circuit for controlling the entering of data and the computation of the minimum increment, in the device according to the invention.

As the timing unit feeds at present the signal INIC specifying the memory positions relating to the axis X and the staticizer 65 feeds the address signal ICSI, the signal COIN is generated (FIG. 14). As the signals VELO and DATA are activated, the signal COIN generates the control signal INVE, which allows entry of the speed digits in the memory (FIG. 20).

Therefore, the signals INVE and GI00 (the letter specifying the memory register) allow the bits of the first speed digit to be transferred from the transcoder output SEIN to the input S002 of the adder 71. As the second input S001 of said adder 71 is fed only by a series of zeros, the bits of said first speed digit come to the output USOM of said adder 71 without any change.

Said adder output USOM, through the logical network 51 and the input channel GUAB (FIG. 12), feeds the writing staticizer.

The speed bits are then written in the register B of the memory LDR, which, as known, is specified by the timing signals GI00 and TI00.

When thereafter, the second speed digit K2V is entered, the corresponding 24 bits representing this digit on the outputs of the serializer 78, through the adder 71, are added to the 24 bits contemporaneously fed to said adder 71 on the output S001 through the channel GIAB and representing the speed digit already entered in the memory LRD.

The other speed digits are entered in an analogous way. Therefore, it is clear that the conversion from the decimal-binary form to the pure binary form of the five digit numbers representing the speed is operated by successively adding the binary digits equivalent to the successive decimal digits.

At the end of the memory cycle, during which the 5 speed digits $K1V \div K5V$ have been entered, the signal FIN is generated by the "AND" function of the signals DATA, DE59, INAZ, CIF8 setting the flip-flop 77 (FIG. 14).

Consequently, the signal SIVE is activated which opens the gate 115, so allowing the delay line LDR to be closed in a ring comprising the gate 114, the reading staticizer LEAB and its output channel GIAB, the open gate 114, the output channel GUAB, the writing staticizer REAB, the three stage shift register 113 and the gate 115, so that in the following memory cycle the contents of the register B is shifted three binary positions consequently the 24 bits of the maximum admissible speed entered from the tape 56 to the memory LDR are carried into the binary denominations from 20 to 43.

As the signal INVE has set the flip-flop 76 so generating the signal AN01 (FIG. 14), the tape is caused to progress one step, so that an address character is again read, e.g. IX as per the already stated program block. The corresponding decoded signal AUIC (FIG. 9) is stored in the staticizer 64 and contemporaneously it sets to zero all the other input staticizers 63, 65, 66, 67 and 68. So the staticizer output ICSI is activated and, as already explained, it causes the tape 56 to progress one step more and the digit counter to be set on CIF1. After stopping the tape, the reader 57 reads a sign character SX, whose decoded signal SEP0 is then stored in the staticizer 68. So the staticizer output SEPI is activated or not according to said sign signal representing the signal "+" or "−" respectively. Accordingly, as the signal INNU is activated (by the presence of the signals DATA, VELO and COIN, the latter being the "AND" function of the address signal ICSI and the timing signal INIC) (FIG. 14), the adder 71 is predisposed to add or to subtract respectively.

Next, as the signal DATA has been activated at the beginning of the memory cycle specified by GAP2 and consequently also the output AN01 of the flip-flop 76 has been activated (FIG. 14), the tape is caused to progress once more forwards.

After stopping the tape, the reader 57 reads the first digit character K1X, which represents the most significant digit of the coordinate $x2$. This digit and the six following digits K2X, K3X, K4X, K5X, K6X, K7X, are entered in the register D, in a way analogous to the one described reference to the entering of the five speed digits. The signal INNU (controlling the entry of the coordinate digits) is now operating instead of the signal INVE (controlling the entry of the speed digits) (FIGS. 12 and 21).

It is to be noted that, more precisely, the 24 bits of the end coordinate $x2$ are entered both in the positions 33 to 56 (specified by the timing signals DE33 to DE56) of the register D and in the positions 1 to 24 (specified by the timing signals DE01 to DE24) of the register C, because in the present conditions ($VELO$="0") the signal CODE is activated contemporaneously to the signal C008 (FIG. 21) and consequently it is apt to allow the bits represented on the lines MA01 to MA24 to be transferred on the output SEIN of the serializer 78 (FIG. 11) each time said lines are scanned, so that during timing the first 32 positions of a memory register specified by the timing signals DE01 to DE32 ($INSI$="1") (FIG. 13) said lines MA01 through MA24 are scanned a first time and their bits are transferred to the memory register C ($GI00$="1"), while during timing the remaining positions of a memory register specified by the timing signals DE33 to DE59 ($INSI$="0"), said lines MA01 through MA24 are scanned to a second time and their bits are transferred to the memory register D ($GI00$="0").

Due to this special entering, it is clear that in the register D a quantity $H \cdot x2$, already considered in the general description, is stored.

Moreover it is to be noted that, according to the sign character read and memorized in the staticizer 68, the adder 71 has been predisposed to add or subtract (i.e. to furnish unchanged bits or to complement them in the case only one of its inputs is fed). Therefore, the 24 bits of the end coordinate $x2$ are stored, unchanged or complemented, in the memory registers C and D according to the sign of said end coordinate.

The entering operations for the maximum speed and the end coordinate relating to axis X are repeated successively for the other axes Y and Z. The data read from the tape are entered in the section of the memory LDR corresponding to the read address heading each program number. This operation is performed under the control of the signal COIN (FIG. 14), specifying the coincidence of the address of the read digit block with the address of the memory register. More particularly the address signals ICSI, IPSI and ZETA furnished by the staticizers 64, 65 and 66, respectively, specify the address of the speed or coordinate digits which are now being read, while the memory addresses furnished as timing signals INIC, INIP and INAZ by the timing counter 14 specify the memory positions wherein data relating to axes X, Y and Z respectively, are contained.

By resuming, the occurrence of control signals operating on the progress of the tape 56 and of the digit counter 74, is as follows: after reading and decoding each new address character (AUIC, AUIP, and AUIZ), it is staticized cancelling any other address character previously staticized; the "OR" function of the address signals sets to zero the digit counter 74 (i.e. CIF1 is activated); after each start and stop of the tape, the signal INDI is generated, which takes the digit counter to count one digit forwards. When the tape character can be read ($RILE$="0"), the signal DATA is activated lasting a memory cycle and setting up the flip-flop 76 so as to activate AN01, in order to move the tape one step forwards.

At the end of entering the data, the flip-flop 77 is energized, activating the signal FIIN which generates the signal CAIN controlling the calculation of the minimum increment $hx$. In fact, as already explained, said minimum increment is obtained from the difference $$H \cdot x2 - H \cdot x1$$

wherein $H \cdot x2$ is stored in the memory, register C, while $H \cdot x1$ is stored in the memory register I at the end of the interpolation operations ($x1$ being the coordinate of the starting point of the next following trajectory segment to be travelled). Therefore, said signal CAIN operates so as to product a subtraction of the contents $H \cdot x1$ of the memory register I from the contents $H \cdot x2$ of the memory register C (FIG. 13). More particularly, the quantity $H \cdot x2$ is fed to the input SO01 of the adder 71 through the channel GICD and the gate 112, while the quantity $H \cdot x1$ is fed to the input SO02 of the same adder through the channel GIIL and the gate 120, and said adder 71 is conditioned by CAIN to function as subtracter. The result of the subtraction $H \cdot x2 - H \cdot x1$ is then fed on the adder output USOM and, through the gate 121 and the channel GUEF, is stored in the memory register E, specified by the timing signals TI02 and GI00. Moreover, the contents $H \cdot x2$ is rewritten in the memory register C.

Moreover, the signal CAIN sets the flip-flop 76, so activating the output AN01 which operates the progress of the tape one step forwards.

Now two cases can occur: (a) the reader 37 reads an auxiliary order character: in this case the digit counter 74 rests, an auxiliary order signal is sent to the corresponding operation relay, and the tape is carried once more forwards; (b) the reader reads the block end character CR, whose decoded signal AUVI is stored in the staticizer 63; then the activated staticizer output VIAC starts the interpolation operations.

ENTERING OF DATA BY MANUAL SETTERS

The initial operations (i.e. the general zeroizing of the machine and the setting of the movable part on the program zero) are analogus to the ones performed for entering data by a program tape.

Successively, the selectors 16, 17, 31 and 34 (FIG. 7) are positioned on the position CON, which allows the data to be entered by the manual setters of the panel 55 (FIG. 9). In this condition the activated signal $\overline{\text{AUMA}}$, in the presence of the signal LAFI (activated by FINE after the general zeroizing) deenergizes the flip-flop 28 so as to activate its output $\overline{\text{AUTO}}$.

Successively, the selector 32 is positioned on the position VEL or POS, according to the requested feeding of speed data or coordinate respectively, so that the flip-flop 33 is set or reset by the signal VEMA or POMA respectively. When said flip-flop 33 is energized and its output ABIM is activated, the manual coordinate setters are operable, while, when said flip-flop 33 is deenergized and its output $\overline{\text{ABIM}}$ is activated, the manual speed setter is operable.

A selector 46 allows the desired axis for the speed and for the coordinates to be selected: more precisely, the position ICMA relates to the axis X, the position IPMA to the axis Y and ZEMA to the axis Z. The outputs of said positions are selectively activated by the signal MAVI, furnished by the flip-flop 21 when pressing the pressbutton START, and they operate analogously to the decoded address signals AUIC, AUIP and AUIZ respectively, while the output VEMA of the selector 32 operates as the decoded speed signal VAUT.

In the embodiment shown on FIG. 7 each axis X, Y, Z must be manually selected on the selector 46, before entering the data relating to said axis. It is also possible to provide the program unit with suitable means which, after manually selecting an axis, can effect the automatic selection of the other axes.

The coordinate setters 59, 60 and 61 (relating respectively to the coordinates $x$, $y$ and $z$) and the speed setter 62 are activated by the control signals ICSI', IPSI', ZETA' and ABIV respectively, which are established in the conditions previously described.

Each coordinate setter 59, 60 and 61 comprises a sign selector ($+/-$) and 7 decimal digit selectors, indicated respectively by the symbols $m$, $dm$, $cm$, $nm$, $de$, $ce$, $\mu$ defining the weight of the decimal digit selectable thereon. Each of said 7 selectors, which allows to set up anyone of the decimal digits 1 to 9, is activated by a corresponding output signal CIF2 to CIF8 of the digit counter 74 is provided with 9 output channels, each one representing a decimal digit 1 to 9.

The "OR" function of the outputs SEIC, SEIP and SEZE of the sign selectors operate analogously to the decoded sign signal SEPO.

The speed setter 62 comprises 5 decimal digit selectors, indicated respectively by the symbols $dam/1'$, $m/1'$, $dm/1'$, $cm/1'$, $mm/1'$ defining the range of speed of the decimal digits selectable thereon. Each of said 5 selectors, which allows to set up anyone of the decimal digits 1 to 9, is activated by a corresponding output signal CIF2 to CIF6 of the digit counter 74 and is provided with 9 output channels, analogously to the coordinate setters.

The output channels of said setters 59, 60, 61 and 62 representing the same decimal weight are connected in "OR" function, so as to obtain 9 manual setting channels BA01' through BA09', each one being then connected in "OR" function to the corresponding digit output (BA01 through BA09) of the decoder 58.

The entering of data by the manual setters simulates exactly the entering of data by the program tape. Therefore, the relevant operations will not be described here. We only note that, after setting up a program block on the panel 55, i.e. the coordinate digits on the setters 59, 60 and 61 and the speed digits on the setter 62, and after positioning the address selector 46 and the speed/coordinate selector 32, the entry is started by pressing the pressbutton START. The digit counter 74 then counts as during the automatic entering, and through its outputs CIF2 to CIF8 activate the different preset digits relating to the coordinates and to the speed, starting always from the most significant digit.

INTERPOLATION OPERATIONS

Figure 22:
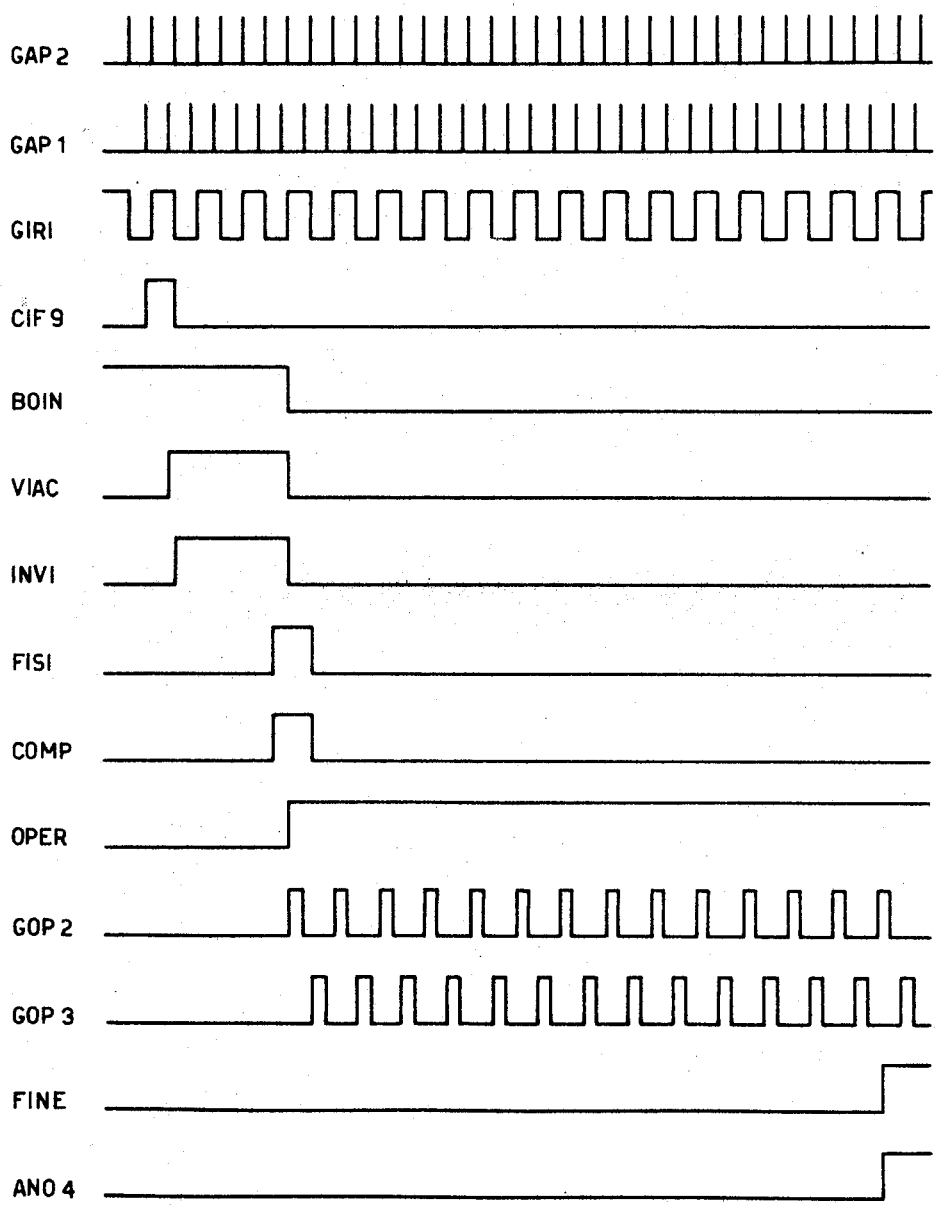
FIG. 22 is a time diagram of some signals controlling the interpolation operations in the device according to the invention.
Figure 25:
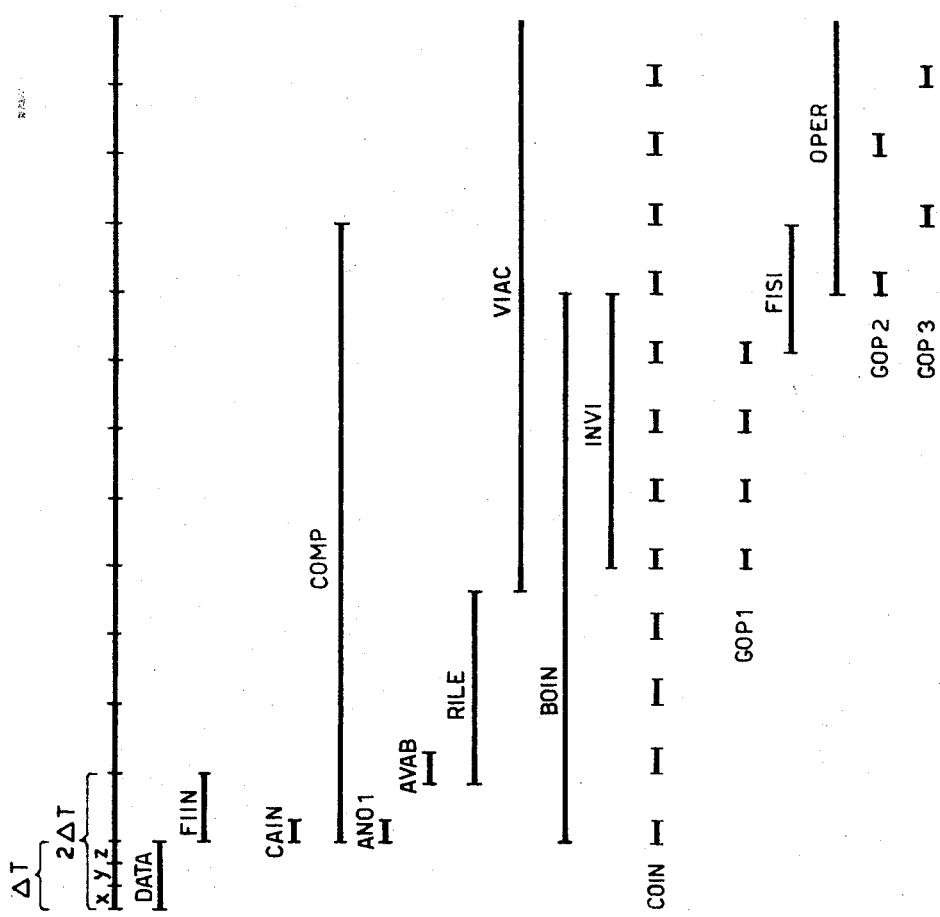
FIG. 25 shows a time diagram of the principal signals controlling the operations of the interpolating unit in the device according to the invention.

After reading the last digit character relating to a program block, the signal CAIN is generated, as already described, so as to activate the signal BOIN (FIGS. 19 and 23). If the successive read character is a block end character CR, i.e. an interpolation starting character which activates the decoded signal VIAC, the output INVI of the flip-flop 122 is energized and consequently the control signal GOP1 is activated (FIGS. 22 and 25). The last named signal operates a shift of the contents of the memory register E towards the most significant denominations. We remember that the contents of the memory register E are constituted by the result of the difference $H \cdot x2 - H \cdot x1$, calculated in the way already described and used to obtain the minimum increment $hx$.

Said shifting operation is conditioned by the presence of GOP1, which causes the contents of the register E of the recirculating memory LDR to pass through the one-stage delaying element 115 and the open gate 116, so that they are rewritten in the memory register E shifted one denomination at each memory turn (FIG. 12).

When the most significant digit of the number contained in the memory register E has a prefixed binary denomination, e.g. the 27th denomination specified by the timing signal DE27, the output FISI of the flip-flop 123 (FIG. 23) is energized at the end of the relevant memory cycle, and it cancels the signal GOP1, so stopping the shifting operation.

Therefore, the minimum increment $hx$ so calculated has the most significant bit located in the binary denomination of the register E next following said prefixed binary denomination, i.e. for the considered example in the 28th denomination.

Said prefixed binary denomination is variable through a selector 117 (FIG. 23). provided with five positions corresponding respectively to DE27, DE28, DE29, DE30 and DE31.

Supposing that the interpolation period lasts 5 ms., said four positions correspond to the following values of the maximum admissible acceleration: 2.5 mm./s.$^2$, 5 mm./s.$^2$, 10 mm./s.$^2$, 20 mm./s.$^2$ and respectively 40 mm./s.$^2$.

As FISI is activated, during the successive memory cycle the output OPER of the flip-flop 124 is energized and it generates the control signal GOP2 (FIGS. 22 and 24), during which all the comparison operations for the change of the acceleration and the calculations (4) and (6) are performed. Moreover, during the next following memory cycle, OPER generates the control signal GOP3, during which the new positions of the movable part of the machine relating to the acceleration phase are calculated through the Formulae 2 and 3.

Moreover, the calculation (11) is performed during the presence of the control signal GOP2 and the calculation (5) is performed during the presence of the control signal GOP3. As the calculation (11) is operated contemporaneously to (6) and the calculation (5) is operated contemporaneously to (3), it is necessary that the control device is provided with two adders 71 and 72.

More particularly, in the course of the first interpolation phase T1 (FIG. 2), during the presence of the control signal GOP2, the calculation (4) furnishing the value of the progressive distance $$xn - x1 = \sum_{1}^{n} Dxn$$

is performed by the adder 71, conditioned to function as a subtracter and fed on the input SOO1 with the contents $Dxn$ of the register I, through the channel GIIL and the gate 126, and on the input SO02 with the contents $$\sum_{1}^{n-1} Dxn$$

of the register A, through the channel GIAB and the gate 128.

Moreover, also the calculation (6), defining the value Rxn of the distance still to be travelled is performed during the control signal GOP2 by the adder 71, fed on the input SO01 with the contents x2 of the register D, through the channel GICD and the gate 112, and on the input SO02 with the contents xn of the register L, through the channel GIIL and the gate 120.

For the axes Y and Z the calculation (11), defining the corrected coordinate, is performed by the adder 72 contemporaneously to the execution of the calculation (6).

During the control signal GOP3 the calculation (2), furnishing the position increment $Dx(n+1)$, is performed by the adder 71, fed on the input SO01 with the contents Dxn of the register I, through the channel GIIL and the gate 126, and on the input SO02 with the contents of the register E, through the channel GIEF and the gate 127. The result $Dx(n+1)$ fed on the output USOM is then written in the register I, through the gate 125 and the channel GUIL.

Moreover, also the calculation (3), defining the position $x(n+1)$ occupied by the movable part of the machine at the end of the nth interpolation cycle, is performed during the control signal GOP3 by the adder 71, fed on the input SO01 with the contents xn of the register L furnished through the channel REIL and the gate 129, and on the input SO02 with the contents Dxn of the register I furnished through the channel GIIL and the gate 120.

Contemporaneously to the calculation (3), the adder 72 operates the calculation (5), defining the value of the fictitious distance Pxn, by adding the contents $$\sum_{1}^{n} Dxn$$

of the register A, fed on the input SO21, to the contents Dxn of the register I, fed on the input SO22.

When the maximum admissible speed DxnM has been reached and, consequently, the control signal VECO has been activated (as explained in the next chapter), the calculations (2) and (4) are stopped, because said signal VECO blocks the entry of the second addend quantity to the relevant adder 71, 72. Therefore, during the second interpolation phase T2 only calculations (3) and (6) are performed, so that the movable part travels at constant speed.

At the beginning of the third interpolation phase T3 (which starts when the distance still to be travelled Rxn becomes lower than the fictious distance PxnM, stored in the register A at the end of the acceleration phase), a deceleration signal ORDE is activated, which conditions the adder 71 to operate as a subtracter during said phase T3, in order to execute the calculation (2').

At the end of the deceleration phase T3 (which occurs when the position increment Dxn becomes lower than a prefixed value) a deceleration end signal FIDE is activated, which stops the calculation (2') by blocking the entry of the second addend quantity to the adder 71. Therefore, only calculation (3) is performed during the next phase T4, so that the movable part travels at constant speed.

When the arrival point P2 is reached, a signal FINE is generated, which activates the control signal GOP4, cancelling GOP3 (FIG. 24). Said control signal GOP4 activates the gate 118, so allowing the end coordinate x2 to be transferred from the register D into the register L in the place of the continuously increased coordinate xn.

Moreover, GOP4 cancels the contents in all other registers of the memory LDR, in order to prepare them for new interpolation operations.

The control signal GOP4 ends when the flip-flop OPER is reset by GAP1 at the end of a memory cycle.

The control signals GOP1, GOP2, GOP3 and GOP4 last generally a memory cycle. However it is possible, by suitable means not represented in the drawings, to reduce their presence to a fraction of memory cycle during which only a preestablished axis is interested, in order to perform the interpolation only along said axis.

In order to correctly execute the comparison operations described in the next chapter, the sense of the movement is memorized by means of a flip-flop 130 for the axis X and a flip-flop 131 for the axis Y (FIG. 23). The signal SEME is activated either by axis X or by axis Y, if their movement sense is negative.

The digital-to-analog converter 101 is connected, during the first memory cycle of each interpolation cycle ($GIRI=$"0"), to the register L containing xn through a suitable serial to parallel converter 119 (FIG. 12), while during the second memory cycle of each interpolation cycle ($GIRI=$"1") is connected to the output SOM2 of the second adder 72. Consequently, during said first memory cycle, the digital-to-analog converter 101 is fed with xn, while during said second memory cycle said converter 101 is fed with $2yn+Dyn$ (for the axis Y, and analogously for the axis Z), according to the correction Formula 11. The quantity $2yn+Dyn$ is then divided by 2 (as explained in the general description), simply by shifting one binary position when entering it in serial to parallel converter 119.

COMPARISON OPERATIONS

The comparison operations performed during the interpolation generate the control signals VECO, ORDE, FIDE, PAFI and FINE, which distinguish the different phases of the movement of the movable part along a trajectory segment.

Figure 26:
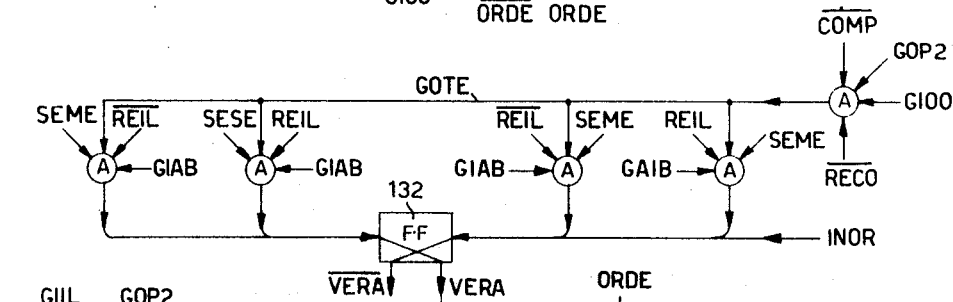

VECO (constant speed control signal) is generated when the inequality (7), $Dxn>DxM$ occurs. For this purpose a logical network controlling a flip-flop 132 (FIG. 26) compares the successive pairs of bits coming from the registers B (containing DxM) and I (containing Dxn) according to the following criteria:

Each time, during the presence of GOP2 and GIO0 and being SEME="0," the following circumstances occur REIL="1" (representing Dxn)
GIAB="0" (representing DxM)

the condition (7) is verified and, consequently, the output VERA of the flip-flop 132 is activated;

If, on the contrary, the following circumstances occur

REIL="0" (representing Dxn)
GIAB="1" (representing DxM)

then is $Dxn<DxM$ and, therefore, the flip-flop 132 is de-energized.

When SEME="1" (negative sense of the movement) the above considerations are to be reversed.

During the presence of GOP3 the activated output VERA of the flip-flop 132 energizes the flip-flop 133, whose activated output VECO controls the interpolation phase T2 at constant speed.

Figure 27:
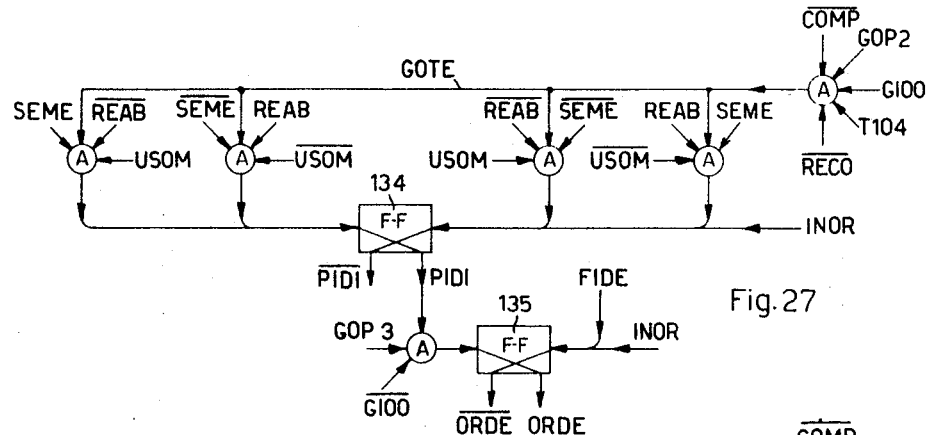
FIGS. 26, 27, 28, 29 and 30 show logical circuits controlling the operations for changing the acceleration in the device according to the invention.

ORDE (deceleration control signal) is generated when the inequality (8), $Rxn<PxnM$, is verified. Analogously to the preceding case, a logical network controlling a flip-flop 134 (FIG. 27) compares the successive pairs of bits coming from the register A (containing PxnM) and from the output USOM of the adder 72 (which furnishes the quantity Rxn, as it is fed by the registers D and L in order to obtain the difference ($x2-xn$) representing Rxn) according to the following criteria:

Each time, during the presence of GOP2 and GIO0 and SEME="0," the following circumstances occur USOM="0" (representing R$xn$)
REAB="1" (representing P$xn$M)

the inequality (8) is verified and, consequently, the output PIDI of the flip-flop 134 is activated;

If, on the contrary, the following circumstances occur

USOM="1" (representing R$xn$)
REAB="0" (representing P$xn$M)

then R$xn$>P$xn$M and, therefore, the flip-flop 134 is deenergized.

When SEME="1" (negative sense of the movement), the above considerations are to be reversed.

During the presence of GOP3, the signal PIDI energizes the flip-flop 135, whose activated output ORDE controls the interpolation phase T3 at constant deceleration.

Figure 28:
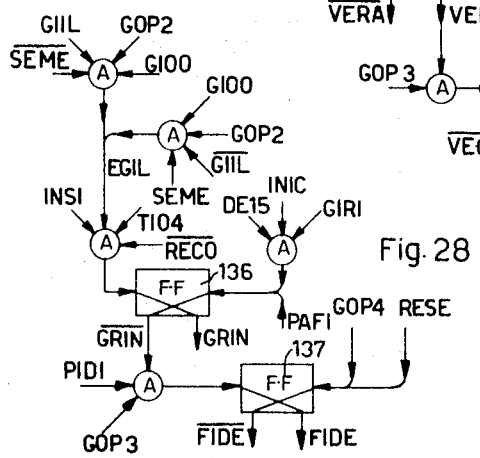

FIDE (deceleration end signal) is generated when the inequality (9), D$xn$<1 $\mu$m., occurs, the control signal ORDE being preexistent. For this purpose a logical network controlling a flip-flop 136 (FIG. 28) explores the register I containing D$xn$, in order to ascertain whether there are bits having a weight higher than 1 $\mu$m. or not (the binary denominations explored are the ones specified by the timing signals DE33 to DE59, said denominations being completely specified by the signal INSI).

Therefore, each time during the presence of GOP2, GIOO and INSI, and being SEME="0," the following circumstance occurs GIIL="0" (representing D$xn$)

the condition (9) is verified and, consequently, the output GRIN of the flip-flop 136 is not activated. Said flip-flop 136 is deenergized by DE15.

When SEME="1" (negative sense of the movement), the above considerations are to be reversed.

During the presence of GOP3 and PIDI, the signal GRIN energizes the flip-flop 137, whose activated output FIDE controls the interpolation phase T4 at constant speed.

Figure 29:
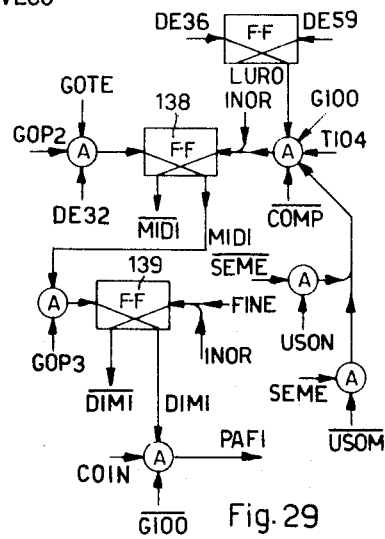

PAFI (end step signal) is generated when the inequality (10), $x2-xn$<16 $\mu$m., is verified. For this purpose a logical network controlling a flip-flop 138 (FIG. 29) explores the difference $x2-xn$ fed by the output USOM of the adder 71, in order to ascertain whether there are bits having a weight higher than 8 $\mu$m. or not (the binary denominations explored are the ones specified by the timing signals DE37 to DE59). Therefore, each time during the presence of GOP2 and GIOO and being SEME="0," the following circumstance occurs USOM="0" (representing $x2-xn$)

the condition (10) is verified and, consequently, the output MIDI of the flip-flop 138 remains activated, as said flip-flop has been energized by the coincidence of the signals GOP2 and DE32.

When SEME="1" (negative sense of the movement) the above considerations are to be reversed.

During the presence of GOP3 the signal MIDI energizes the flip-flop 139, whose activated output DIMI generates PAFI, controlling the interpolation phase T5 at constant speed.

Figure 30:
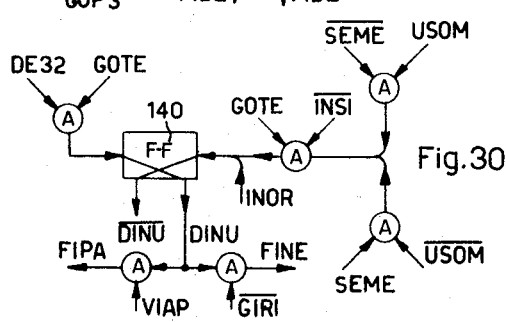

FINE (end position signal) is generated when the inequality (10'), $x2-xn$<1 $\mu$m., is verified. For this purpose a logical network controlling the flip-flop 140 (FIG. 30) explores the difference $x2-xn$ fed by the output USOM of the adder 71 in order to ascertain whether there are bits having a weight higher than 1 $\mu$m. or not (the binary denominations explored are the ones specified by the timing signals DE33 to DE59).

Therefore, each time during the presence of GOP2 and GIOO (GOTE) and being SEME="0," the following circumstance occurs USOM="0" (representing $x2-xn$)

the condition (10') is verified and consequently the output DINU of the flip-flop 140 remains activated, as said flip-flop has been energized by the coincidence of the signals GOP2 and DE32.

When SEME="1" (negative sense of the movement) the above considerations are to be reversed.

The signal DINU generates the signals FINE, specifying the end of the control operations, and FIPA, specifying the end of a program stroke.

It is clear that the control device according to the invention is applicable not only to machines having a part movable along rectilinear axes, but also to machines having a part movable along one or more rotary axes. As shown, when a movable part of the machine is displaced along one or two or more rectinlinear axes, the instantaneous speed along said axes has a ratio between them represented by the Formula 1. It is clear that the control device according to the invention operates in a way respecting the Formula 1 even when one or more axes are rotary axes.

Supposing that the machine is provided with a rectilinear axis and a rotary axis, as the trajectory calculated by the interpolating unit is numerical, it is possible to generate (e.g. by a lathe) cylindrical, conical or helicoidal surfaces. To perform with high precision a thread having whatever pitch and length, it is sufficient to specify its length and the number of pitches contained therein. Therefore, the described electronic control device can completely substitute the known complex systems provided with mechanical change-ratio gears, necessary to execute different threads.

What we claim is:

1. A system for controlling the feed of a movable machine part from a previous coordinate point to a remote arrival point along coordinate axes wherein the motion along selected axes is controlled according to programmed input information specifying the coordinates of each arrival point, comprising:

(a) a program unit responsive to the arrival of the machine member at a point and operative to deliver the coordinates of the next arrival point;

(b) an interpolating unit operating through multiple successive intenpolating cycles to compute and accumulate multiple positional increments between the previous coordinate point and the specified arrival point, the interpolating unit including for each controlled axis means for determining ratios representing the relative rates of progression along the axes required to proceed in a straight line between the previous and arrival points, and said interpolating unit including means operative during its cycles for computing said coordinate positional increments for each controlled axis so that the positional increments have relative magnitudes proportioned in said ratios, the interpolating unit having one coordinate register for each controlled axis operative to accumulate said increments in addition to the coordinate of the previous point until the specified arrival point coordinates are approached; and said interpolating unit further including means for performing an acceleration phase by adding differential increments during successive interpolating cycles to progressively increase said ratio-proportioned positional increments until an increment reaches a predetermined value representing the maximum admissible speed of the movement, the interpolating unit having register means for remembering the sum of said increasing increments, the interpolating unit including means for performing a constant velocity phase by repeating during successive interpolating cycles the last increased increments until the remaining distance to the arrival point approaches said sum, and the interpolating unit including means for then performing a deceleration phase by progressively decreasing said ratio-proportioned increments by said differential increments;

(c) converter means for continuously converting the coordinate positions accumulated in said coordinate registers to output signals; and (d) servo-system means responsive to said output signals to position said movable machine part according to the instantaneous output signals and progressively advance it toward said specified arrival point.

2. In a system as set forth in claim 1, said means in the interpolating unit for determining ratios including means for differencing the respective coordinates of the arrival point and the previous point for each controlled coordinate axis, and for computing therefrom ratios representing said relative rates of progression.

3. In a system as set forth in claim 1, said programmed information further specifying inputs representing maximum admissible acceleration of the movement along the controlled axes while proceeding to the specified arrival point, and said interpolating unit having means for computing said differential increments based upon said input representing the maximum admissible acceleration.

4. In a system as set forth in claim 1, said means for performing said deceleration phase commencing that phase when said remaining distance to the arrival point equals said sum plus a predetermined final distance, and said deceleration performing means including means for computing and accumulating in said coordinate registers position increments of decreasing magnitude by subtracting differential increments during successive interpolating cycles until said final distance is reached, and then for accumulating final small position increments until said arrival point is approached.

5. In a system as set forth in claim 4, said interpolating unit including digital means for storing said small position increments and including means for comparing therewith said increments of decreasing magnitude until the latter approach the former, and including means for continuing to accumulate said small position increments thereafter into said coordinate register.

6. In a system as set forth in claim 5, said interpolating unit including means operative during accumulation of said small position increments and before said arrival point is reached to further reduce the magnitudes of said small increments to still lower magnitudes when the remaining distance to the arrival point equals a predetermined limit.

7. In a system as set forth in claim 4, said interpolating unit including means operative when said arrival point is approached for entering into said coordinate registers the specified coordinates of the arrival point, which replace the previously accumulated positional coordinates, instead of entering further increments.

8. In a system as set forth in claim 1, said interpolating unit having a cyclic memory comprising a circulating data path including said coordinate registers and said remembering register means, and the data relating to all of the controlled axes being serially circulated in said path at least twice during each interpolating cycle, arithmetic means operative during one of said recirculating cycles to compute the ratio-proportioned positional increments to be added to the remembering register means, and comparison means operative during another of said recirculating cycles for comparing said increments with said predetermined maximum speed and further operative to compare said sums with said remaining distance to the arrival point and responsive to these comparisons to control said arithmetic means.

9. In a system as set forth in claim 1, the interpolating unit including means for performing an acceleration phase by adding differential increments during successive interpolating cycles to increase said ratio-proportioned increments, the interpolating unit having register means for remembering the sum of said increasing increments; said interpolating means further including means for determining during each interpolating cycle the remaining distance to the arrival point and for comparing this distance with said sum, and said interpolating unit having means responsive to the approach of said sum to said distance for performing a deceleration phase by progressively decreasing said ratio-proportioned increments.

10. In a system as set forth in claim 9, said deceleration performing means including means for computing and accumulating in said coordinate registers position increments of decreasing magnitude until a final predetermined distance to the arrival point is reached, and then for accumulating final small increments until said arrival point is approached.

11. In a system as set forth in claim 1, said interpolating unit having a cyclic memory comprising a circulating data path including said coordinate registers and said remembering register means respectively corresponding with the controlled coordinate axes, and the data path comprising a delay line wherein $n$ storage registers are serially arranged, each one being adapted to store $m$ characters having $b$ bits so that the delay line can contain $n.m.b$ bits, corresponding bits of the $n$ registers being stored in contiguous positions, and the period of a memory cycle being a submultiple of the fixed period of the interpolating cycle period.

12. In a system as set forth in claim 11, there being at least two controlled axes along which the machine part is fed, said data in said storage registers being in digital form and said converter means comprising a single digital-to-analog converter interposed between said coordinate registers and said servo-system means and coupling the contents of each of said coordinate registers to the corresponding servo-system during time intervals which are equal to an integral sub-multiple of the interpolating cycle period to control in real time the positioning of the movable part.

References Cited

UNITED STATES PATENTS

| | | |
|---|---|---|
| 3,109,974 | 11/1963 | Hallmark. |
| 3,110,865 | 11/1963 | Scuitto. |
| 3,122,691 | 2/1964 | Centner et al. |
| 3,204,132 | 8/1965 | Benaglio et al. |
| 3,344,260 | 9/1967 | Lukens. |

THOMAS E. LYNCH, Primary Examiner

U.S. Cl. X.R.

235—151.11; 318—162